United States Patent [19]

Baugher et al.

[11] 4,087,308
[45] May 2, 1978

[54] APPARATUS AND METHOD FOR MAKING REINFORCED ELASTOMERIC FABRIC

[75] Inventors: Robert Charles Baugher, Akron; Robert Henry Bond, Cuyahoga Falls; Walter William Immel, Sr., Stow; Ralph Frederick Kiemer, Akron, all of Ohio

[73] Assignee: The Steelastic Company, Akron, Ohio

[21] Appl. No.: 676,903

[22] Filed: Apr. 14, 1976

[51] Int. Cl.$^2$ ............................................. B29H 17/00
[52] U.S. Cl. .................................. 156/405 R; 83/157; 156/437; 156/512; 156/544; 156/560; 198/419; 226/158
[58] Field of Search .................. 156/133, 157-159, 156/304, 405 R, 405 P, 437, 502, 512, 522, 544, 560; 83/157, 276, 277, 451, 373, 554, 563; 198/418, 419, 429, 854, 858, 859; 226/95, 158, 159, 147, 162, 150; 271/107

[56] References Cited

U.S. PATENT DOCUMENTS

| | | | |
|---|---|---|---|
| 2,720,963 | 10/1955 | Stanley et al. | 198/559 |
| 3,433,690 | 3/1969 | Barns | 156/157 |
| 3,574,040 | 4/1971 | Chitwood et al. | 156/522 |
| 3,607,576 | 9/1971 | Phillips | 156/157 |
| 3,688,963 | 9/1972 | Snow et al. | 226/162 |
| 3,803,965 | 4/1974 | Alderfer | 83/276 |
| 3,841,183 | 10/1974 | Zyl | 83/157 |
| 3,867,228 | 2/1975 | Brinkley et al. | 156/405 |
| 3,888,717 | 6/1975 | Koyama et al. | 156/159 |
| 3,933,565 | 1/1976 | Printz et al. | 156/304 |
| 3,962,022 | 6/1976 | Bottasso et al. | 156/304 |

Primary Examiner—William A. Powell
Assistant Examiner—John E. Kittle
Attorney, Agent, or Firm—Hamilton, Renner & Kenner

[57] ABSTRACT

The present invention relates to an apparatus and method for making sheets from reinforced elastomeric ribbon. The apparatus has a lead-in mechanism on which the ribbon is received for preliminary orientation. The apparatus also employs a transfer mechanism that incorporates a shuttle head which is supported by a primary carrier disposed over the assembly mechanism. The shuttle head is capable of being protracted from its normal position over the assembly mechanism to a position over the lead-in mechanism where it is also engaged by a stabilizing carrier which assures precise orientation of the shuttle head during its operative movements with respect to the lead-in mechanism. So stabilized the shuttle head: engages and grasps the ribbon presented by the lead-in mechanism; raises the ribbon off the lead-in mechanism; retracts to position the ribbon above the assembly mechanism; and, accurately deposits the ribbon on the assembly mechanism. A guillotine mechanism severs the incremental strip deposited on the assembly table from the ribbon. After the shuttle head disengages from the incremental strip the guillotine mechanism is moved out of contact with the incremental strip so that the incremental strip can be transferred laterally by an indexing mechanism to the degree required for receipt of a successive incremental strip without inadvertent interference between the strip, or strips, being indexed and the guillotine. To achieve indexing the assembly mechanism employs a continuous belt that is accurately indexed by a unique arrangement of interacting brake and transport clamps. For most purposes, successive strips will be deposited in contiguous, lateral juxtaposition, and in order that the successive strips stick together a stitcher is provided to cycle a stitching roller along the abutting edges of successively deposited incremental strips.

44 Claims, 21 Drawing Figures

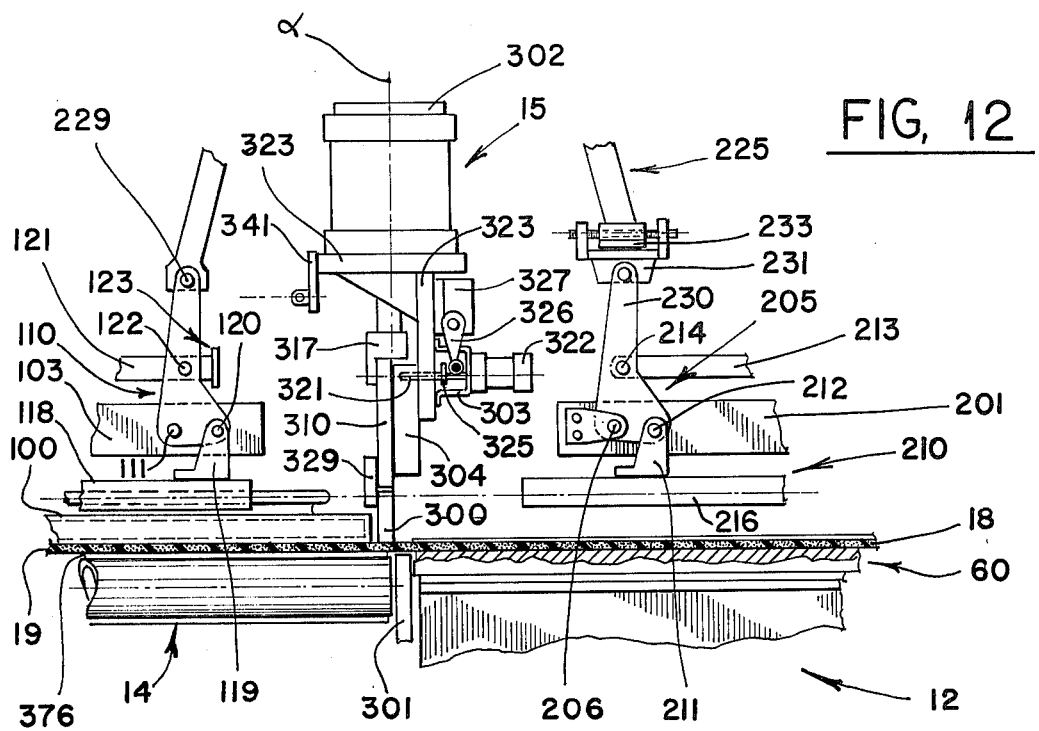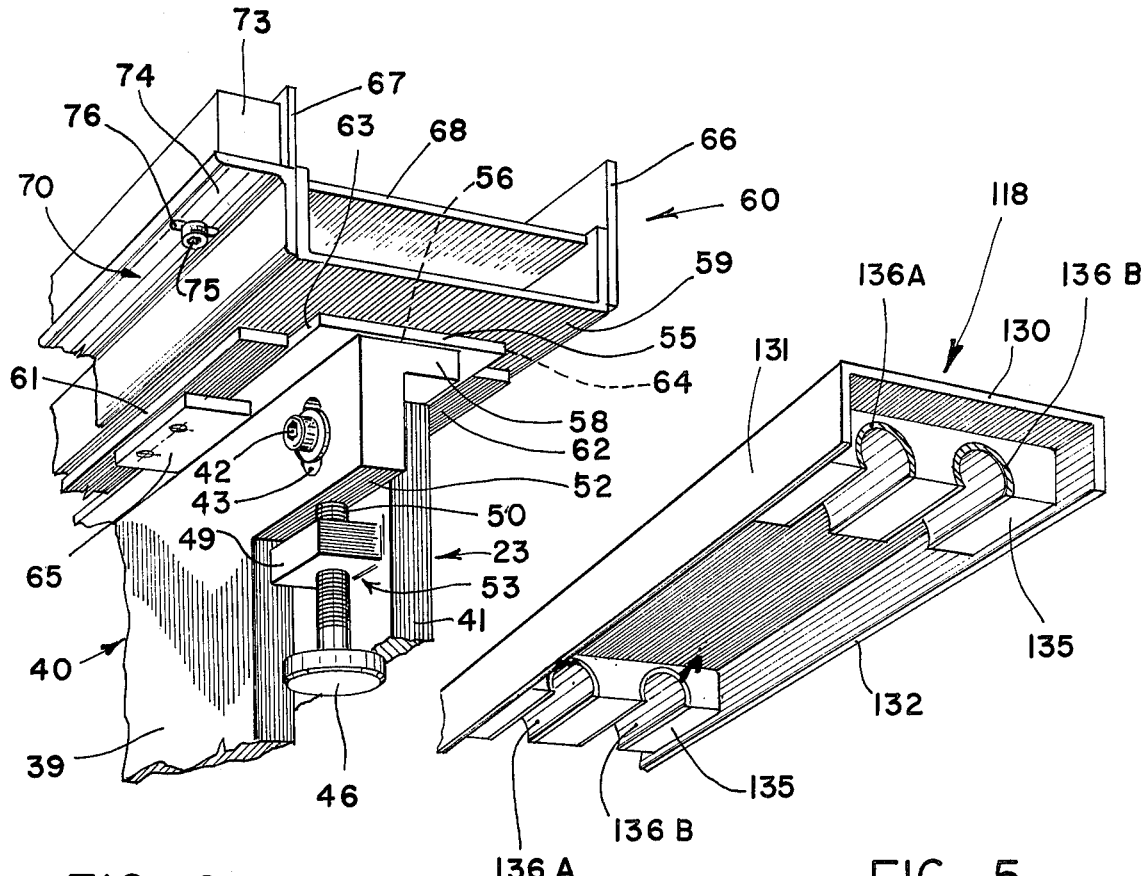

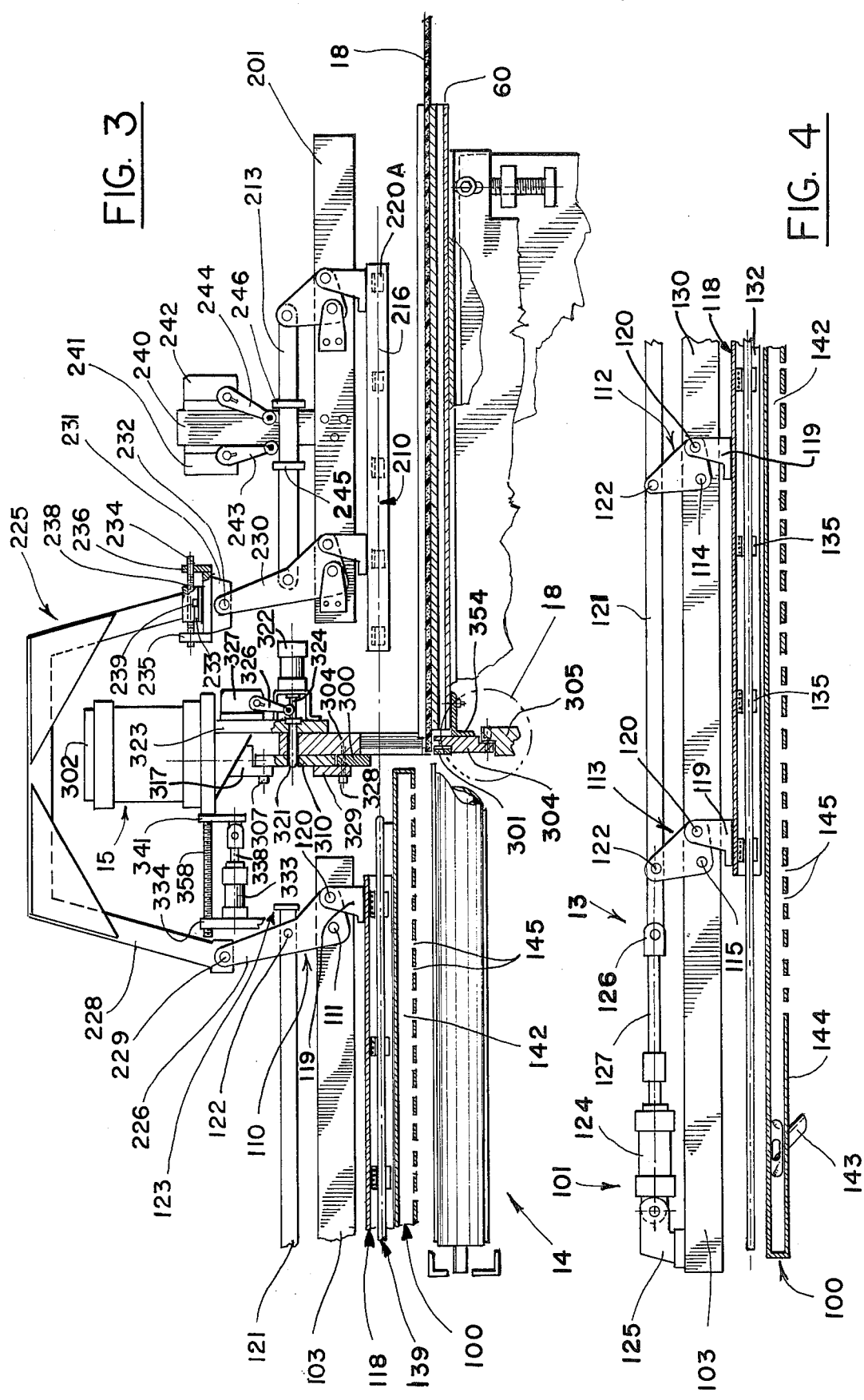

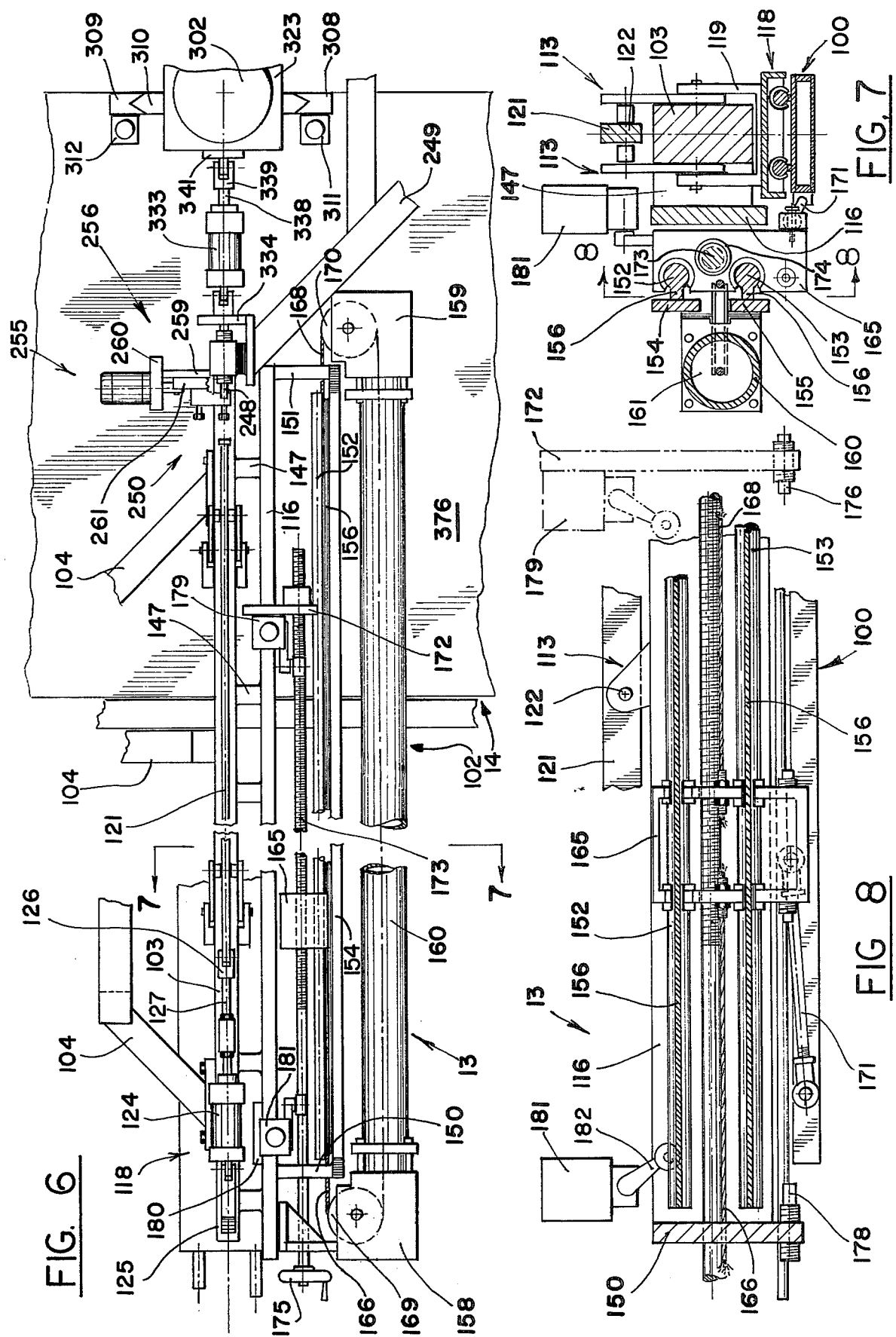

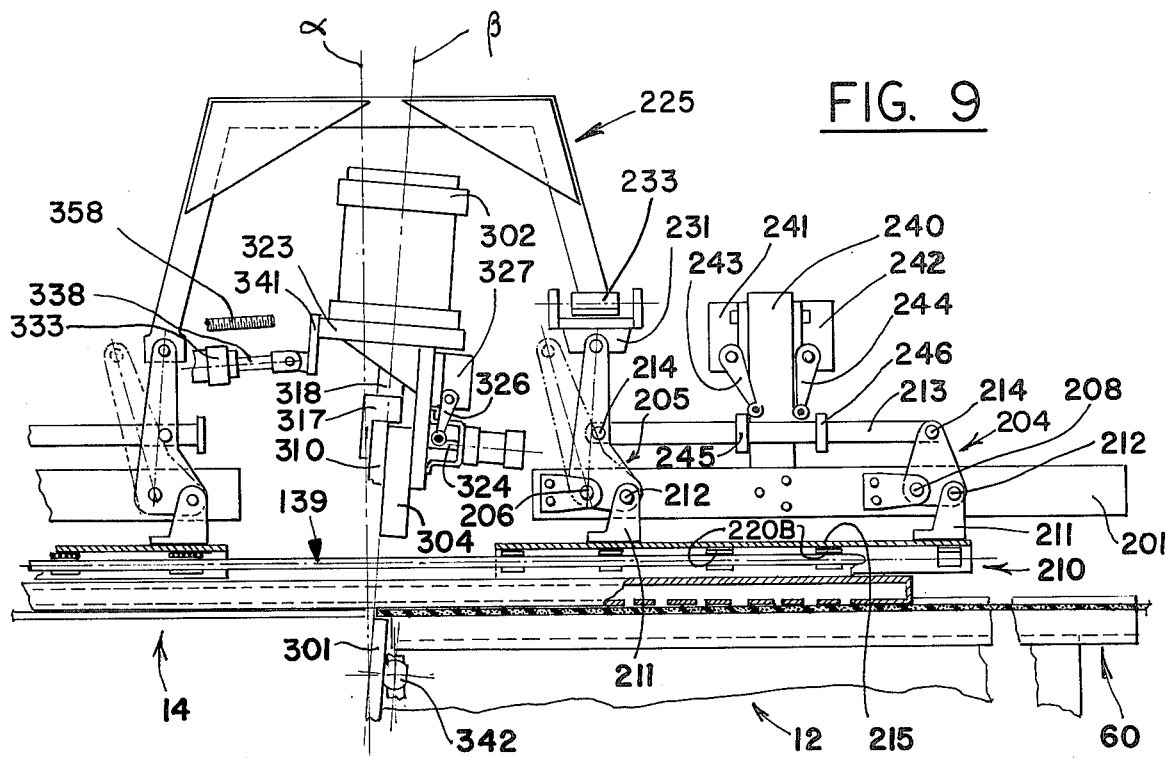
FIG. 9
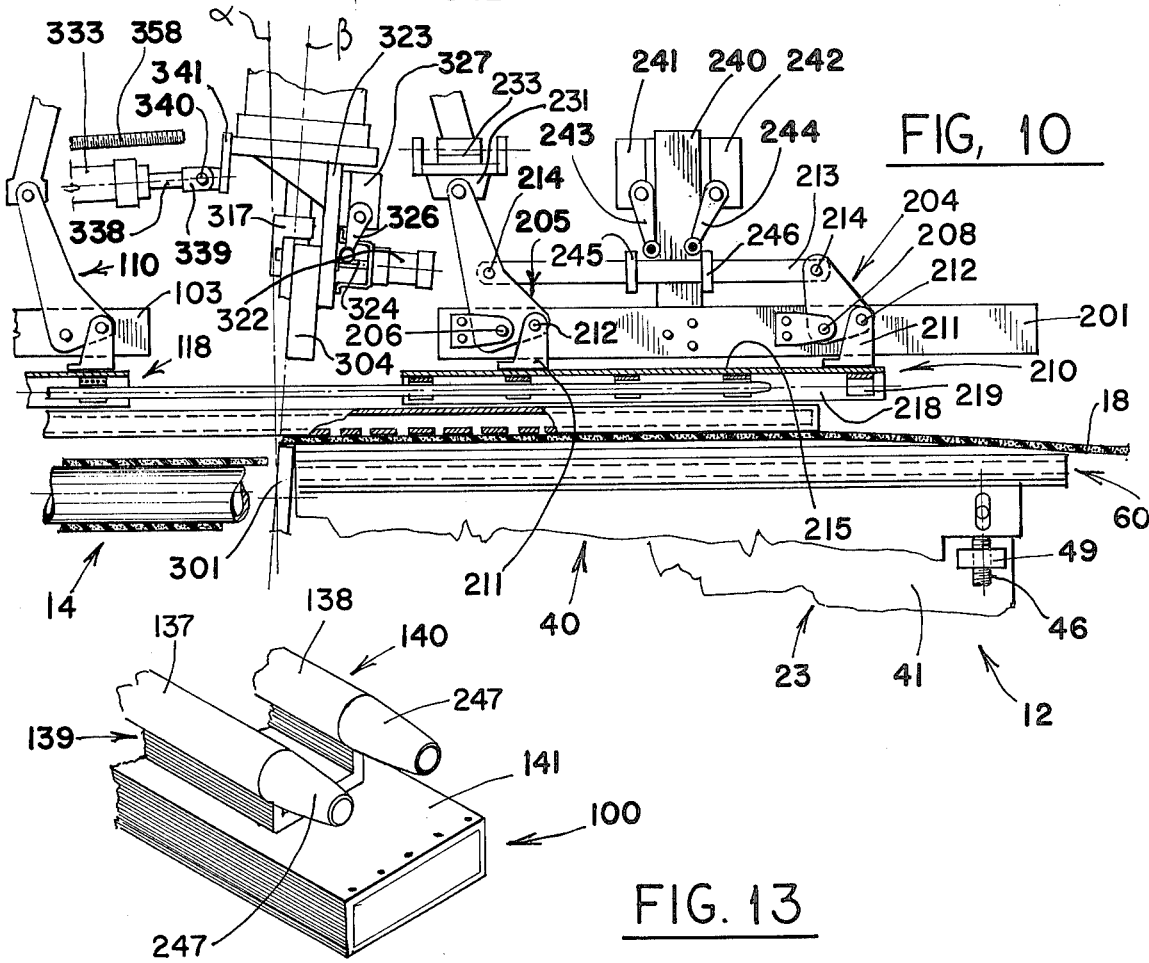
FIG. 10
FIG. 13

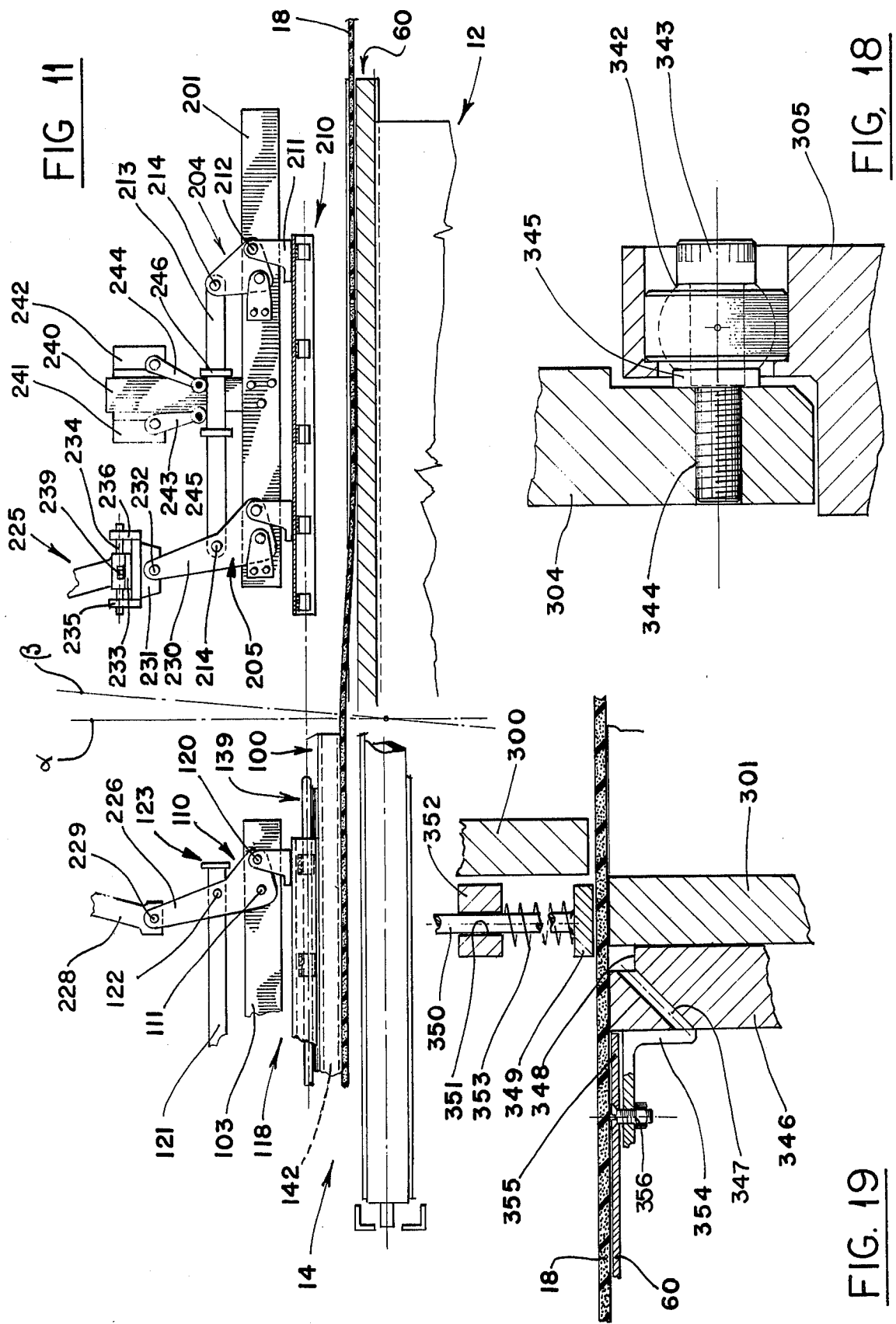

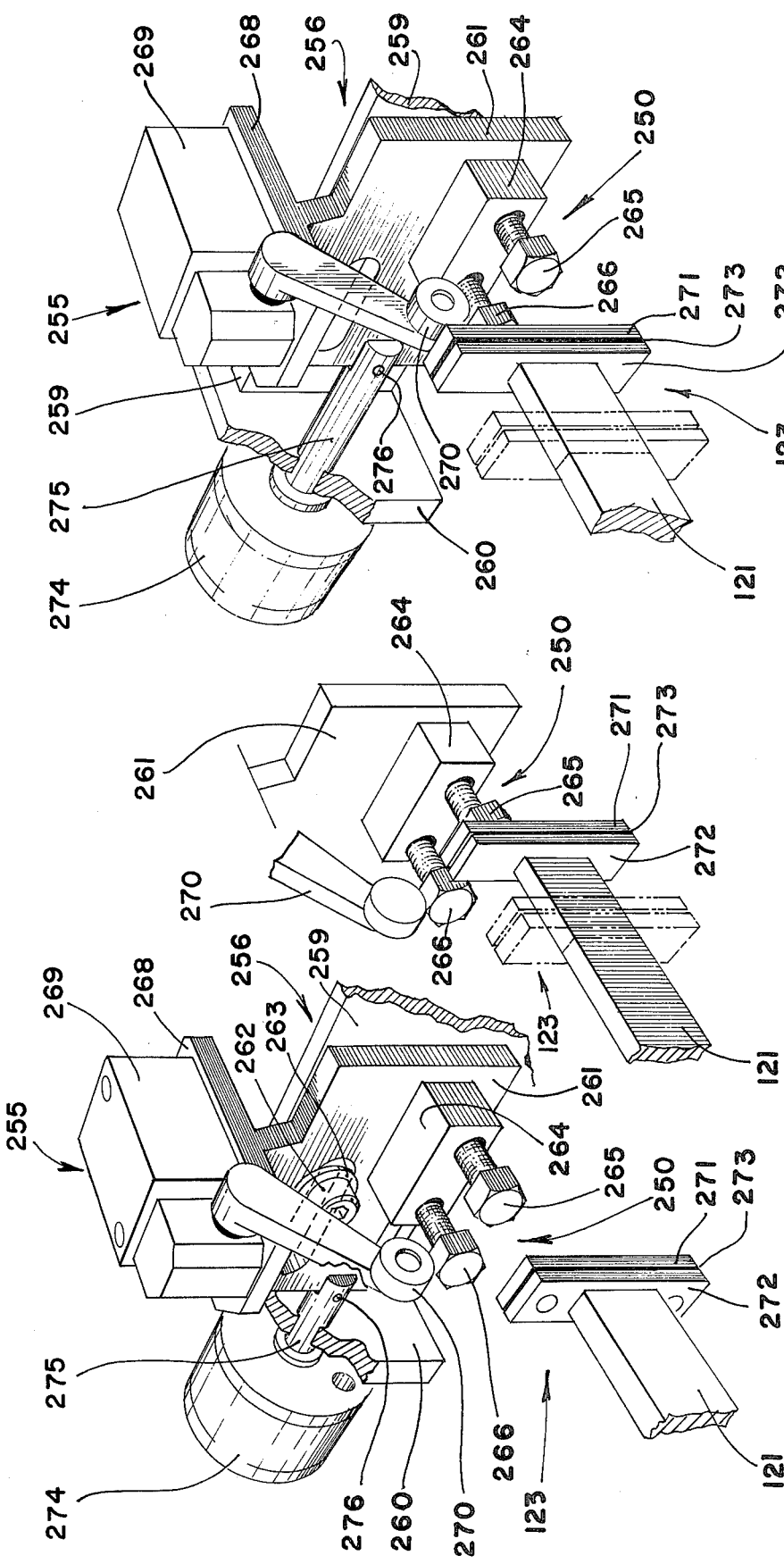

APPARATUS AND METHOD FOR MAKING REINFORCED ELASTOMERIC FABRIC

BACKGROUND OF THE INVENTION

The present invention is directed toward improvements in an apparatus and method for the manufacture of reinforced elastomeric fabrics which are ultimately incorporated in a variety of goods including power drive belts, reinforced hose, containers such as fuel cells and, most particularly, in tires. With the exception of modern, cast elastomer technology, which does not require reinforcement, it has been well recognized that conventionally employed elastomeric stocks, e.g., rubber, do not possess the inherent strength either to maintain their integrity during the processing steps necessary to obtain the desired article or ultimately to function as an acceptable product when subjected to normal use. Thus, the elastomers have been reinforced as sheets, or layers of fabric, by the inclusion of embedded tibers, mono or polyfilament, which are considerably less extensible than the elastomer. These filaments, or reinforcing cords, include materials such as cotton, synthetics such as rayon, nylon and polyesters, fiberglass and metallic wire, particularly steel, either single strand or cabled.

Calendering has been the historic way in which to make reinforced elastomeric fabric, especially for tire plies; however, calendering requires expensive equipment and highly skilled operators to make the sheets of fabric, particularly in widths sufficient to provide a predetermined biased orientation of reinforcing filaments within the finished tire or other article.

When fabric is calendered the reinforcing cords are oriented parallel to the length of the fabric emanating from the calender. As such, in order for the reinforcing cords to be angularly inclined with respect to a circumferential reference plane when the fabric is incorporated in a tire, it is necessary to cut the fabric on the bias. Bias cutting, particularly when the angle desired demands a long cut, is a difficult process requiring expensive machinery and entails considerable waste.

In view of the cost of wire reinforcing, such waste is intolerably expensive and attempts have therefore been engendered to devise an apparatus for severing elemental strips from a continuous ribbon of wire reinforced material and assembling those elemental strips in adjacent juxtaposition so as to form a belt, or sheet, in which the reinforcing material is disposed at the desired bias.

Such attempts have largely centered upon feeding the ribbon past a cutting mechanism and onto an assembly table at a predetermined angle with respect to the cutting mechanism; severing a strip of predetermined length from the ribbon; and, manipulating the strip so as to stitch it to the preceding strip on the assembly table. Only after considerable experimentation was it discovered that the ribbon could not be satisfactorily fed past the cutting mechanism and onto the assembly table. In prior known devices the flexible nature of the ribbon has required considerable manipulation of the strip subsequent to the time it was severed from the ribbon in order to effect even a modicum of satisfactory stitching to the precedingly deposited strip. As such, apparatus embodying the "feeding" approach have become unduly complicated and the results too unpredictable for commercial acceptance.

One apparatus which has eliminated the need for calendering by the assembly of elemental strips severed from a continuous ribbon to form a reinforced fabric of desired width, has been described in U.S. Pat. No. 3,803,965, which patent is owned by our common assignee, The Steelastic Company. The apparatus and accompanying method by which it is operated have enjoyed commercial acceptance throughout the world for the production of reinforced fabric of varying widths, bias angles and carrying any of the known reinforcing filaments. The apparatus is particularly suitable for the manufacture of wire reinforced fabric, the wire comprising the commonly known, expensive steel cables or the wire helices described in U.S. Pat. No. 3,682,222, also owned by our common assignee.

In order to simplify the following disclosure, the aforementioned apparatus may be briefly summarized, including: an extruder through which the reinforcing filaments are drawn and encapsulated in an uncured, elastomeric compound, the composition of which is not necessarily important to the inventions described herein inasmuch as it will vary according to the desired uses of the resulting fabric; guide means for preliminarily orienting the reinforced ribbon, drawn from the extruder, on a lead-in table; a transfer means for positively engaging a portion of the ribbon on the lead-in table, metering a predetermined length thereof and withdrawing it; an assembly table upon which the metered, withdrawn length of ribbon is deposited by the transfer means; and, a guillotine means for severing the strip of predetermined length from the ribbon subsequent to its precise deposition upon the assembly table by the transfer means. A detailed description of the operation of this apparatus may be found in the aforementioned patent, U.S. Pat. No. 3,803,965, the subject matter of which is hereby incorporated by reference.

Notwithstanding the favorable operability of this apparatus, it has been found that the manufacture of relatively large widths, e.g., greater than two feet, of reinforced fabric, for uses such as body plies of radial truck tires, has necessitated some improvements to the basic apparatus. These improvements are of a nature that they have refined the operation of the basic apparatus irrespective of the width, thickness, bias angle or other parameters of the reinforced fabric being produced.

One of the problems has been the accurate deposition of larger strips of the reinforced ribbon. When it became desirable to construct wider fabrics, it became necessary to employ longer strips. Moreover, to increase the efficiency as well as the output of the apparatus, the width of each strip was increased inasmuch as an increase in the width of the strips resulted in a decrease in the number of strips necessary to form a reinforced fabric of any given length. It was thus found that movement of a larger transfer means to accommodate the greater dimensioned ribbons required more guidance and support than when the smaller strips were being transferred.

Another problem relates to the joining of the several elemental ribbons together to form the continuous fabric in a manner which provides a fabric which will not separate during subsequent fabrication operations. Still another problem relating to joining of the strips, resides in the precise indexing or forward incremental movement of the assembly table to facilitate the accurate deposition of each successively laid severed strip of ribbon.

A major problem is encountered when the severed incremental strips are indexed along the assembly mechanism at, or at approximately, 90° with respect to the orientation of the ribbon on the table portion of the lead-in mechanism. This problem is further compounded when metallic reinforcing filaments are employed. In this situation, the action of the guillotine means, or vertically opposed knife blades, which sever each strip, occasionally results in a puckering of the last severed strip on the assembly table against the stationary lower knife blade. Frictional engagement therewith can retard advancement of that strip upon the assembly table sufficiently to cause malalignment thereof. Alternatively, the end of the severed strip, and particularly the metal reinforcing filaments therein, is in contiguous juxtaposition with the leading end of the continuous ribbon which impedes the free advancement of the strip during indexing of the assembly table again causing malalignment of the strip.

Obviously, separation of adjacent strips or the malalignment thereof from whatever cause is not conducive to the production of acceptable fabric or the trouble-free operation of the apparatus. Accurate positioning of successive strips upon the assembly table and the maintenance of that position during subsequent steps of fabric formation is thus essential and problems which would interfere with either are desirably to be eliminated.

SUMMARY OF THE INVENTION

It is, therefore, an object of the present invention to provide an improved apparatus and method for producing reinforced fabric from elemental strips of reinforced ribbon larger than those which have been employed on existing apparatus.

It is another object of the present invention to provide an improved apparatus and method for producing reinforced fabric from elemental strips of reinforced ribbon by combining successive strips with greater accuracy than heretofore possible.

It is still another object of the present invention to provide an improved apparatus and method for producing reinforced fabric from elemental strips of reinforced ribbon which includes a stitcher assembly for joining strips of reinforced ribbon successively deposited upon an assembly table.

It is yet another object of the present invention to provide an apparatus and method for producing reinforced fabric from elemental strips of reinforced ribbon which includes an improved means for transferring the reinforced ribbon to the assembly table.

It is a further object of the present invention to provide an apparatus and method for producing reinforced fabric which includes an improved means for severing elemental strips of reinforced ribbon from the continuously produced ribbon.

These and other objects, together with the advantages thereof over existing and prior art forms, which will become apparent from the following specification are accomplished by means hereinafter described and claimed.

In general, an apparatus embodying the concept of the present invention has a lead-in mechanism on which a ribbon of reinforced elastomeric material is received and preliminarily aligned.

A transfer mechanism incorporates a shuttle head that is presented from a primary carrier. This carrier is itself movable vertically to raise and lower the shuttle head. The shuttle head is movable horizontally by virtue of rail means provided on the shuttle head which slidably engage bearings mounted in the carrier. This transfer mechanism, including the shuttle head in its normally retracted position, are positioned over an assembly mechanism in the apparatus.

A stabilizing carrier is located above the lead-in mechanism and presents a plurality of bushings that slidably engage the rail means on the shuttle head when the shuttle head is protracted. A yoke means interconnects the primary and stabilizing carriers so that they raise and lower in unison.

A guillotine mechanism is located between the lead-in and assembly mechanisms. The guillotine mechanism severs the incremental strips of the ribbon transferred from the lead-in to the assembly mechanisms and then is laterally displaced out of contact with the incremental strips so that the guillotine mechanism will not interfere with movement of the incremental strips as they are being indexed on the assembly mechanism.

The assembly mechanism employs an endless belt on which the incremental strips are deposited, and this belt is continuously secured by either brake or index clamps. The brake clamps serve to maintain the belt in a fixed position, and they are cyclically releasable to allow the index clamps to advance the belt a predetermined distance. The sequence in the grasping and releasing of the belt by the clamps assures that the belt is always clamped by one or both such clamps and precludes inadvertent movement of the belt.

A stitching mechanism spans the belt on which the incremental strips are deposited, and a roller is cycled to follow along the abutting edges of the successive strips in order to stitch them together.

Although it has been found highly desirable to extrude the ribbon of elastomeric compound with the reinforcing material encapsulated therein, it should be appreciated that the reinforcing material may well be calendered between opposed ribbons of elastomeric material with facility and the resulting "sandwich" fed onto the table of the lead-in mechanism of the subject apparatus.

A preferred embodiment of apparatus, and one suitable for practicing the method of the present invention, to make fabric from elemental strips of reinforced, but uncured, elastomeric compound is shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 2 is a perspective depicting the outboard end of the table portion of the lead-in mechanism and the elements on which the table portion is slidably supported;

FIG. 3 is a frontal elevation, partly in section and partially broken away, of a portion of the subject apparatus which depicts the relationship of the lead-in mechanism, the assembly mechanism, the transfer mechanism and the guillotine mechanism — the shuttle head portion of the transfer mechanism being disposed above the assembly mechanism;

FIG. 4 is a frontal elevation of that portion of the subject apparatus located to the left of what appears in FIG. 3, partly in section, depicting the details by which the shuttle head of the transfer mechanism is movably mounted above the assembly mechanism;

FIG. 5 is a perspective view depicting the inboard end of the shuttle carrier in which the shuttle head is movably supported and appears on the same sheet of drawings as FIGS. 2 and 12;

FIG. 6 is a top plan of that portion of the transfer mechanism upwardly of the assembly mechanism;

FIG. 7 is a vertical section taken transversely of the transfer mechanism substantially along line 7—7 of FIG. 6;

FIG. 8 is a vertical section taken longitudinally of the transfer mechanism substantially along line 8—8 of FIG. 7;

FIG. 9 is a view similar to FIG. 3 but with the shuttle head of the transfer mechanism protracted and moved to its downward, clamped position to engage the elastomeric ribbon presented on the table portion of the lead-in mechanism;

FIG. 10 is a view similar to FIGS. 3 and 9 with the shuttle head protracted over the lead-in mechanism after having lifted the elastomeric ribbon off the lead-in mechanism;

FIG. 11 is a view similar to FIGS. 3, 9 and 10 with the shuttle head retracted to its position over the assembly mechanism and preparatory to depositing the elastomeric ribbon on the table of the assembly mechanism;

FIG. 12 is a view similar to FIGS. 3, 9, 10 and 11 with the shuttle head retracted to its position over the assembly mechanism and after having deposited the elastomeric ribbon on the table of the assembly mechanism, said FIG. 12 appearing on the same sheet of drawings as FIGS. 2 and 5;

FIG. 13 is a perspective of the outboard end portion of the shuttle head and appears on the same sheet of drawings as FIGS. 9 and 10;

FIG. 14 is a perspective view of the flipper mechanism;

FIG. 15 is a perspective of a portion of the flipper mechanism with the flipper plate being oriented in a first position to depict its interaction with the head portion on a link arm of the transfer mechanism;

FIG. 16 is also a perspective of the flipper mechanism with the flipper plate being oriented in a second position to depict its interaction with the head portion on a link arm of the transfer mechanism;

FIG. 18 is an enlarged area of FIG. 3, as indicated by the chain line circle identified by the numeral 18, and depicting the means by which the guillotine frame is mounted for selective tilting;

FIG. 19 is an enlarged vertical cross section through a portion of the guillotine mechanism depicting the foot which steadies the ribbon for severing, the air channel which holds the secured end of the ribbon in place after the incremental strip has been severed therefrom and the interconnection between the guillotine frame and the table portion of the lead-in mechanism;

DESCRIPTION OF THE PREFERRED EMBODIMENT

Figure 1:
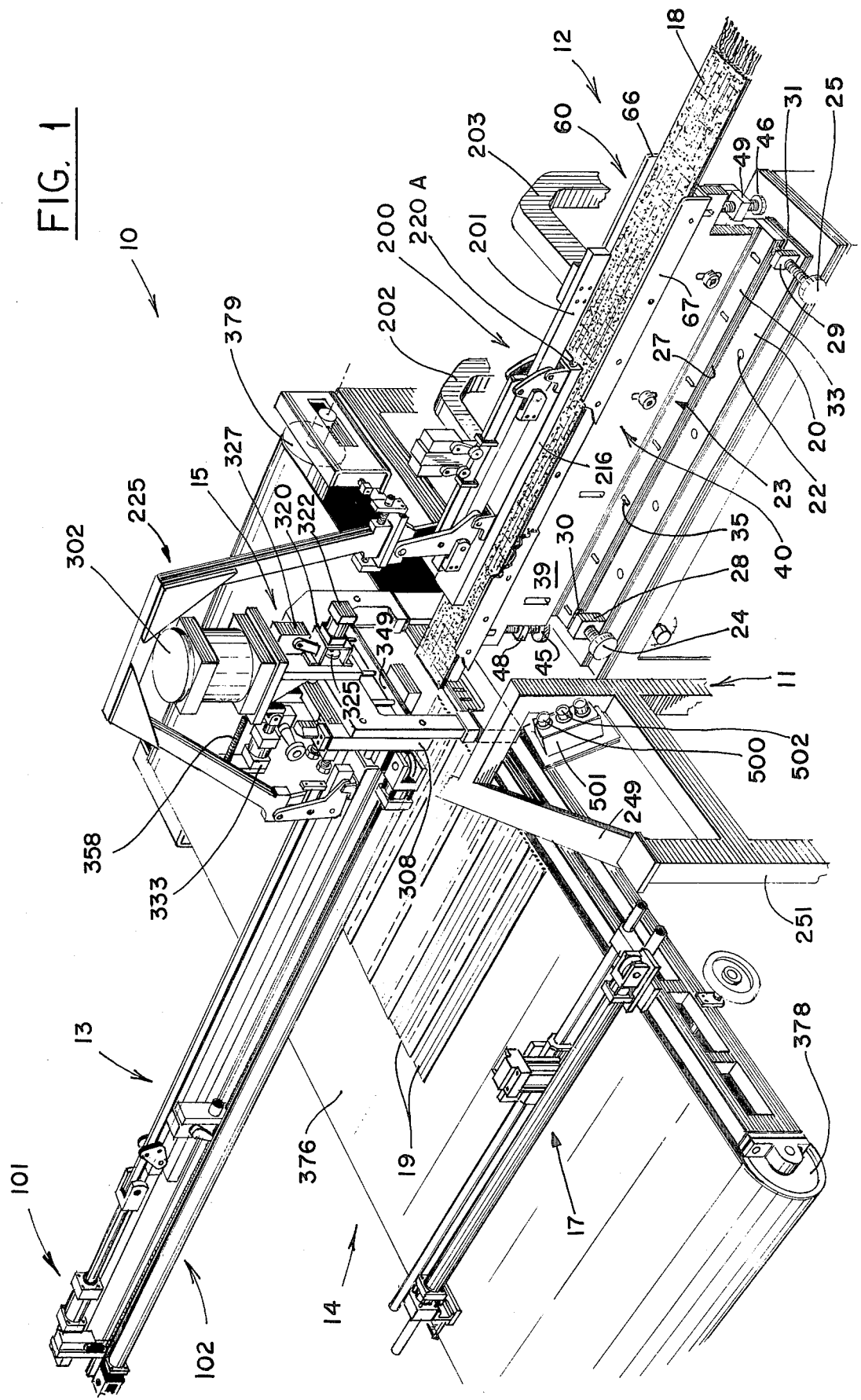
FIG. 1 is a schematic perspective of apparatus for making sheets from reinforced elastomeric ribbon embodying the concept of the present invention and operative according to the method thereof.

The improved apparatus for making sheets from elastomeric ribbon, and embodying the concept of the present invention, is generally designated by the numeral 10 on the attached drawings. The apparatus 10 has a rigid base frame 11 from which is supported the primary mechanisms — i.e., a lead-in mechanism 12, a transfer mechanism 13, an assembly mechanism 14 and a guillotine mechanism 15. Subassemblies carried on the assembly mechanism 14 comprise an improved indexing mechanism 16 (FIG. 20) and a stitcher mechanism 17 (FIG. 21).

The operation of the subject apparatus will be described in detail in the concluding portion of the specification. However, by way of prologue it should be understood that a ribbon 18 of reinforced elastomeric material is presented in predetermined orientation on the lead-in mechanism, and a predetermined length of that ribbon is withdrawn from the lead-in mechanism and accurately deposited on the assembly mechanism by the transfer mechanism. The guillotine mechanism then severs an elemental strip 19 from the ribbon so deposited on the assembly mechanism. After the transfer mechanism releases the elemental strip to the assembly mechanism, the position of that elemental strip is accurately indexed so that the successive elemental strip deposited on the assembly mechanism by the transfer mechanism will be located at the precise degree of lateral juxtaposition desired with respect to the previously deposited elemental strip. The stitcher mechanism is operated in phase with the indexing mechanism to assure that the juxtaposed edges of successive strips will stick together.

Lead-In Mechanism

The disposition of the lead-in mechanism, identified generally by the numeral 12, with respect to the overall apparatus 10 can best be seen in FIG. 1. However, the constructional details are best presented in FIGS. 2 and 3.

The bedplate 20 of the lead-in mechanism 12 is secured to the base frame 11, as by machine screws 22, and a right angled stanchion 23 is mounted on the bedplate 20. The lateral position of the stanchion 23 is preferably adjustable with respect to the bedplate 20, and this function may be accomplished by a pair of thumbscrews 24 and 25 threadably received through collars 28 and 29, respectively, secured to the bedplate 20 and oriented to seat the feet 30 and 31 of the thumbscrews 24 and 25 against the vertical edge 27 of the horizontal leg 33 of the stanchion 23, thus permitting incremental adjustment in the lateral orientation of the stanchion 23. A plurality of cap screws (not shown) pass through slots 35 in the horizontal leg 33 of the stanchion 23 and are received in bores (not shown) in the bedplate 20. The cap screws serve to lock the stanchion 23 in the desired position.

As best seen in FIG. 2, the vertical leg 39 of an L-shaped positioning bracket 40 slidably engages the vertical leg 41 of the stanchion 23 and is selectively secured thereto by a plurality of cap screws 42 which extend through slots 43 in the leg 39 of bracket 40 to be received in tapped bores (not shown) in leg 41 of stanchion 23. To assist in incremental adjustment in the level of bracket 40, a pair of spaced thumbscrews 45 and 46 may be threadably received through mounting lugs 48 and 49 affixed to the vertical leg 41 of stanchion 23. Both thumbscrews may comport to the detail of thumbscrew 46 depicted in FIG. 2 which reveals the foot 50 of thumbscrew 46 as engaging the horizontal, downwardly directed edge 52 of a recess 53 in the vertical leg 39 of bracket 40.

A slide plate 55 is fixed to the upwardly directed face 56 on the horizontal leg 58 of the positioning bracket 40. The base 59 of the input table 60 is slidably received on plate 55. A pair of guides 61 and 62 are mounted on the base 59 and embrace the lateral edges 63 and 64 of the plate 55 to prevent the input table 60 from sliding other than along its own horizontal axis. A plurality of gibs 65 are secured to the respective guides 61 and 62 and slidably underlap the plate 55.

A pair of lateral side plates 66 and 67 are mounted on the input table 60 and form the guideway by which the ribbon is precisely oriented on the receiving surface 68 of the input table 60. Although one side plate — e.g., side plate 66 — may be fixedly secured to the input table, it is preferable that at least one side plate be adjustably positioned in order properly to accommodate and align the particular width of the ribbon being presented. For this purpose an angle bracket 70 may be fixedly secured to the input table 60. The side plate 67 is secured to a locating bar 73 which is, in turn, selectively positionable laterally along the horizontal leg 74 of the angle bracket 70, as by the cap screws 75 which extend through slots 76 in the horizontal leg 74 of angle bracket 70 and which are anchored in corresponding, threaded bores (not shown) in the locating bar 73.

In order to minimize the frictional resistance against the edge of the ribbon, it has been found highly desirable to fabricate the side plates 66 and 67 of a material like pactene plastic.

Transfer Mechanism

The transfer mechanism 13, as can best be seen in FIG. 1, serves to engage the ribbon 18 presented on the input table 60 of the lead-in mechanism 12 and precisely deposit an incremental length, or strip, 19 thereof on the table portion 376 of the assembly mechanism 14.

The element which actually engages the ribbon 18 is the shuttle head 100 which is movably mounted on the transfer mechanism 13 selectively to be moved vertically by virtue of a first, double-acting actuating means 101 and horizontally by virtue of a second, double-acting actuating means 102.

As best seen in FIGS. 3 and 4, the shuttle head 100 is supported above the assembly mechanism 14 by a primary stringer 103 which extends between the outer ends of a plurality of support beams 104 (FIG. 6). In the preferred embodiment three of the beams 104 are cantilevered forwardly from vertical posts (not shown) at the rear of the apparatus.

Three pairs of bell cranks are pivotally mounted on a primary stringer 103. The inboard pair of bell cranks 110 are mounted on pivot pin 111 which extends transversely of the primary stringer 103 in proximity to the guillotine mechanism 15. The medial pair of bell cranks 112, as well as the outboard pair of bell cranks 113, are each mounted on similar pivot pins 114 and 115, respectively, which extend transversely of the primary stringer 103.

A primary shuttle carrier 118 is supported by a plurality of lugs 119, each of which has one end fixedly secured to the carrier 118 and the other end pivotally carried on the individual bell cranks of each pair 110, 112 and 113, as by pivot pins 120. A connecting link 121 extends horizontally above the carrier 118 and is connected to each pair of bell cranks 110, 112 and 113, as by pivot pins 122.

The inboard end of the link 121 is provided with a head portion 123, the purpose for which will hereinafter be more fully explained, and the outboard end of the link 121 is connected to the first actuating means 101. As best seen in FIG. 4 the actuating means 101 comprises a cylinder 124, pivotally connected to a bracket 125 mounted on the stringer 103, within which a double-acting piston (not shown) is slidably received. The piston rod 127 is connected to the link 121, as by clevis 126.

The shuttle carrier 118 is generally channel-shaped (FIG. 5) with the web portion 130 being secured to the lugs 119 (FIG. 4) and with the flange portions 131 and 132 extending downwardly. A plurality of housing supports 135 are spaced axially along the carrier 118 and are secured to the web portion 130 between the flange portions 131 and 132. Each housing support 135 presents a pair of bearings 136A and 136B — the bearings 136A being aligned with the corresponding bearings 136A in the successive supports 135 and laterally spaced with respect to the bearings 136B aligned with the corresponding bearings 136B in the successive supports 135.

The bearings are preferably Thomson bearings (although any equivalent bearing would suffice) of C-shaped cross section which open downwardly in order slidably to receive the bulbous head portions 137 and 138 on the two laterally spaced rails 139 and 140 secured to the upwardly directed surface 141 of the shuttle head 100, as best seen in FIG. 13. The interior of the shuttle head 100 comprises a plenum 142 (FIG. 4) which is attachable to a source of sub- and superatmospheric pressure through a vent flange 143, and the downwardly directed face, or undersurface, 144 of the shuttle head 100 is provided with a plurality of apertures 145 which communicate with the atmosphere through the face 144 to the plenum 142.

The structure heretofore explained effects vertical disposition of the shuttle head 100 and accommodates its horizontal reciprocation. The following explanation is directed toward the structure by which horizontal reciprocation is effected.

As is particularly well depicted in FIGS. 6, 7 and 8 a box frame extends parallel to the shuttle carrier 118. One wall of the box frame comprises a bar 116 that is supported in parallel, spaced relation from the stringer by a plurality of spacer blocks 147 which are secured transversely between the bar 116 and the stringer 103. The bar 116 serves further to stabilize the superstructure for the transfer mechanism 13.

A pair of opposed end plates 150 and 151 are secured to the respective outboard and inboard ends of the bar 116, and a pair of vertically spaced cylindrical rails 152 and 153 extend horizontally between the end plates 150 and 151.

The box frame is completed by a pair of stabilizing bars 154 and 155, one for each rail, which also extend between the end plates 150 and 151 and which are interconnected to their respective rods by spacers 156. Also supported on the box frame in proximity to the end plates 150 and 151, respectively, are a pair of pulley blocks 158 and 159 between which is connected a cylinder 160 within which operates a double-acting piston 161 that is connected to a trolley 165 slidably movable along the rails 152 and 153 by cables 166 and 168. Cable 166 is reeved about the pulley 169 in block 158 and passes through end plate 150 for attachment to one side of trolley 165; cable 168 is reeved about pulley 170 in block 159 and through end plate 151 for attachment to the opposite side of the trolley 165.

A draw rod 171 is attached between the trolley 165 and the shuttle head 100 so that directional selectivity to the axial reciprocation of the shuttle head 100 may be effected directly by the application of fluid pressure to the appropriate end of the cylinder 160 in the double-acting actuating means 102.

The range through which the shuttle head axially reciprocates may be controlled by suitable stops which controllably limit the movement of the trolley 165. The outboard stop may be fixedly located to assure that irrespective of the extent of longitudinal displacement required by the shuttle head 100 its fully retracted position will always be cleared of the guillotine mechanism 15. As such, the end plate 150 may serve as the outboard stop. The extent to which the shuttle head protracts, however, is preferably adjustable, and this purpose can be effected by selective location of a stop block 172.

Stop block 172 is slidably carried on rails 152 and 153 and is selectively positionable by a screw threaded shaft 173 that extends horizontally between end plates 150 and 151 in which it is rotatably journaled. The shaft 173 matingly engages a threaded bore (not shown) through the stop block 172 so that rotation of the shaft 173, as by wheel 175, selectively positions the block 172 at the desired location. The shaft 173 is freely movable through a bore 174 in trolley 165.

One or more shock absorbers 176 are mounted on the stop block 172 to engage the trolley 165 and dissipate the energy encountered as the trolley 165 is brought to a stop at the location determined by location of the block 172. Similarly, one or more shock absorbers 178 may be provided in the outboard stop — e.g., end plate 150. The block 172 also provides a convenient location for mounting switch 179 so that it can be actuated by the trolley 165. Because of the fixed mechanical interconnection between the trolley 165 and the shuttle head 100, selective location of the stop block 172 determines the extent to which the shuttle head 100 will protract.

Conversely, the location of the end plate 150 determines the extent to which the shuttle head 100 will retract. As such, a mounting plate 180 may be secured to the bar 116 in order to present a switch 181, the throw arm 182 of which is tripped by engagement with the trolley 165 when the shuttle head 100 is fully retracted.

Because the success of apparatus embodying the concept of the present invention is predicated to a great extent by the precise accuracy with which successive incremental strips 19 can be positioned on the table portion 376 of the assembly mechanism 14 and because the accuracy with which the shuttle head 100 can deposit the incremental strips is to a considerable degree a function of the accuracy with which the shuttle head 100 engages the ribbon positioned on the lead-in mechanism 12, the present apparatus incorporates a novel means for stabilizing the shuttle head in both its horizontal and vertical movement with respect to the table 60 of the lead-in mechanism 12. This stabilizing means is indicated generally by the numeral 200 in FIG. 1 and is depicted in greater detail in FIGS. 9 and 10.

The stabilizing means 200 is supported by a secondary stringer 201 aligned with the primary stringer 103 and supported between the ends of two cantilevered beams 202 and 203 extending upwardly and forwardly from the rear of apparatus 10. Two pairs of bell cranks 204 and 205 are pivotally mounted on the secondary stringer 201 by virtue of the transverse pivot pins 206 inboard and 208 outboard.

A stabilizing carrier 210 is supported by a plurality of lugs 211, each of which has one end fixedly secured to the stabilizing carrier 210 and the other end pivotally carried on the individual bell cranks of each pair 204 and 205 by pins 212.

A connecting link 213 extends longitudinally above the stringer 201 and is connected to each pair of bell cranks 204 and 205 as by pins 214.

The stabilizing carrier 210, like the primary carrier 118, is also generally channel-shaped with the web portion 215 being dependingly secured to the lugs 211 and with the flange portions 216 (FIG. 12) and 218 extending downwardly from the web portion 215 (FIGS. 9 and 10). A plurality of housing supports 219 are spaced axially along the carrier 210 and are secured to the web portion 215 between the flange portions 216 and 218. Each housing support 219 presents a pair of bushings 220A and 220B — the bushings 220A being aligned with the corresponding bushings 220A in the successive supports 219 and laterally spaced with respect to the bushings 220B aligned with the corresponding bushings 220B in the successive supports 219. The bushings 220 may be simple brass bushings of C-shaped cross section which open downwardly. The row of bushings 220A is precisely aligned with the row of bearings 136A on the primary carrier 118, and the row of bushings 220B is precisely aligned with the row of bearings 136B on the primary carrier 118. As such, the bushings are also adapted slidably to receive the head portions 137 and 138 on rails 139 and 140, respectively.

As can best be seen from FIGS. 1 and 3, a yoke 225 spans the guillotine mechanism 15 and functionally interconnects the primary shuttle carrier 118 to the stabilizing carrier 210.

It will be observed that the inboard pair of bell cranks 110 on the primary stringer 103 each have an extended throw arm 226 to which one end portion 228 of the yoke 225 is pivotally attached, as by pivot pin 229.

As best seen in FIG. 11, the inboard pair of bell cranks 205 on the secondary stringer 201 are also provided with an extended throw arm 230 to which a gimbal 231 is pivotally mounted, as by pivot pin 232. The foot 233 of the yoke 225 rests on the gimbal 231 and a threaded adjusting shaft 234, which is freely journaled through the opposed lugs 235 and 236 on the gimbal meshingly engages a threaded bore 238 through the foot 233 of yoke 225.

Selective rotation of the adjusting shaft 234 effects precise vertical alignment of the stabilizing carrier 210 with respect to the primary shuttle carrier 118, and when the carriers are aligned the alignment can be secured by virtue of one or more cap screws 239 which pass through corresponding slots (not shown) in the foot 233 of the yoke 225 to be threadably anchored in the gimbal 231. Thus, when the shuttle head is protracted the head portions 136 and 138 on the rails 139 and 140 will be slidably received within the corresponding rows of bushings 220A and 220B within the stabilizing carrier 210. To assure that the head portions 136 and 138 will cooperatively interengage the bushings 220 it is preferred that the ends of each head be conically tapered, as at 247 depicted in FIG. 13.

Once the protracted end of shuttle head 100 is supported by the stabilizing carrier 210, operation of the actuating means 101 effects — through yoke 225 — vertically displacement of the shuttle head 100 by positive, concurrent movement of the stabilizing carrier 210 and the primary shuttle carrier 118.

Because the vertical motion of shuttle head 100 is directly related to the coincidence in the horizontal movement of the bell crank links 121 and 213, the vertical position of the shuttle head can conveniently be signaled by the horizontal disposition of those links. As such, a switch mounting bracket 240 may be secured to the secondary stringer 201 with switches 241 and 242 mounted thereon. The respective throw arms 243 and 244 of those switches may be tripped by the corresponding collars 245 and 246 selectively positionably on the bell crank link 213.

It has been found generally desirable to dampen the inertial forces at the end of that throw which lowers the shuttle head 100, and this result can be readily effected by mounting a shock absorber 248 (FIG. 6) on the end of the beam 249 which cantilevers rearward from vertical post 251 (FIG. 1) at the operator's station so as to engage the end portion 228 of the yoke 225.

When the actuating means 101 effects downward, or clamping, movement to the shuttle head 100 it is also desirable to limit the lowermost extent to which the shuttle head descends, and this can be effected by providing an adjustable stop means 250 (FIGS. 6, 14, 15 and 16) against which the head portion 123 on the inboard end of the link 121 can abuttingly engage as it moves horizontally to effect downward displacement to the shuttle head 100.

As will become more apparent during the description of the operation hereinafter set forth, the shuttle head 100 must be lowered to clamping position with respect to the lead-in mechanism 12 during that stage of the operating cycle when the shuttle head initially engages the ribbon 18. The shuttle head must also be lowered to the clamping position during that stage of the operating cycle when the ribbon 18 is deposited onto the assembly mechanism 14. In the first instance the shuttle head is protracted through the guillotine mechanism 15, and in the second instance the shuttle head is retracted with respect to the guillotine mechanism.

Switches 241 and 242 signal whether the shuttle head is in the clamped or raised positions, but it is also imperative to distinguish in which clamped position the shuttle head is disposed — protracted or retracted. In the retracted position guillotine mechanism 15 will operate to sever an incremental strip from the ribbon, but in the protracted position of the shuttle head, operation of the guillotine mechanism 15 cannot be tolerated. A unique flipper mechanism 255 is provided for this purpose, and also serves as a mount for the adjustable stop means 250.

The flipper mechanism 255 is mounted on a supporting plate 256 of generally L-shaped cross section. One end of the leg portion 259 is attached to the primary stringer 103 in proximity to the inboard end thereof. The leg portion 259 of the support plate 256 extends transversely outwardly from the primary stringer 103 and terminates in a base leg 260 oriented in parallel, spaced relation with respect to the primary stringer 103.

A flipper plate 261 is slidably mounted on the leg portion 259 of the support plate 256 for reciprocating motion between a first (FIG. 15) and second (FIG. 16) position. As shown, the sliding mount may be accomplished by retaining bolts 262 secured to the support plate 256 and slidably received in slotted ways in flipper plate 261.

The stop means 250 comprises a lug 264 mounted on the flipper plate 261. Adjustability is achieved by a pair of cap screws 265 and 266 which are screwed into the lug 264. Cap screw 265 is aligned with, and engagable by, the head portion 123 of link 121 when the flipper plate 261 is in its first position (FIGS. 14 and 15), and cap screw 266 is aligned with, and engagable by, the head portion 123 when the flipper plate 261 is in its second position (FIG. 16).

A pedestal 268 is secured to the flipper plate 261 upwardly thereof, and the flipper switch 269 is mounted thereon so that its throw arm 270 can be tripped by the head portion 123 of the link 121 when the flipper plate 261 is in its second position but will be laterally out of the path of travel along which the head portion 123 moves when the flipper plate 261 is in its first position.

In order to minimize any deleterious effects created by repeated engagements of the head portion 123 against the stop means 250, it has been found desirable to construct the head portion 123 with a contact plate 271 that is carried on a head plate 272 secured directly to the link 121 and with an elastomeric cushion 273 interposed between the contact and head plates 271 and 272, respectively.

The flipper plate 261 is moved between its first and second positions by operation of a pancake cylinder 274 mounted on the second base leg 260, the piston rod 275 from which extends through the base leg 260 and is secured to the flipper plate 261, as by the clevis connection 276.

Guillotine Mechanism

Figure 17:
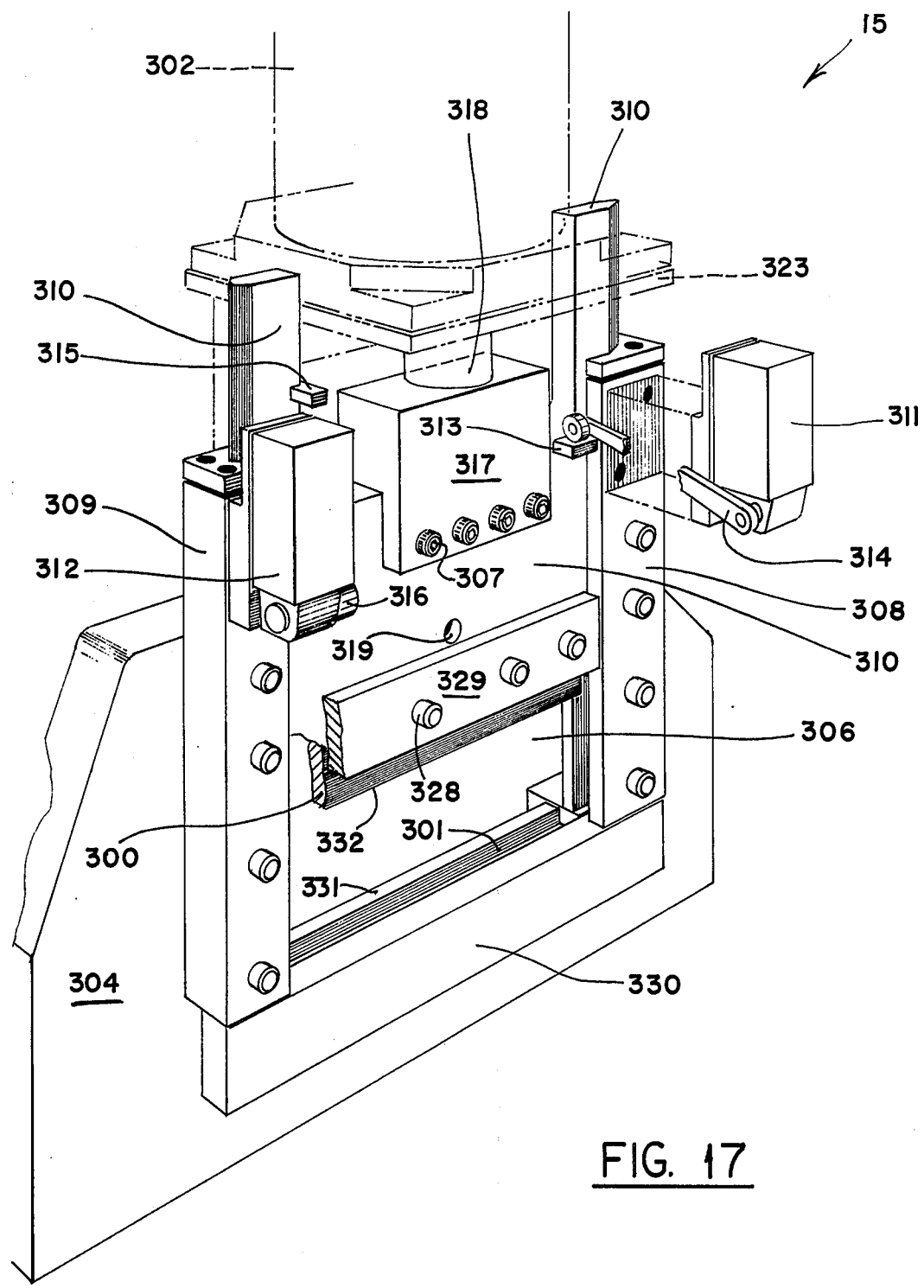
FIG. 17 is a perspective view of the guillotine mechanism as seen from the assembly mechanism side thereof looking toward the lead-in mechanism.

As best seen in FIGS. 1, 3 and 17, the guillotine mechanism 15 is located between the lead-in mechanism 12 and the assembly mechanism 14 and generally includes upper and lower cutting blades 300 and 301, respectively, and a double-acting cylinder 302 which reciprocates blade 300. Both blades 300–301 and the cylinder 302 are supported by the guillotine frame 304 which in turn is rockably secured to a support member 305 (FIG. 3) itself rigidly secured to the base frame 11 in a suitable manner, not depicted. The manner in which the guillotine frame 304 is secured to support member 305 and the purpose therefor shall be set forth hereinbelow.

A passageway 306 is provided through guillotine frame 304 to allow reciprocation of shuttle head 100 between the input table 60 of lead-in mechanism 12 and the assembly mechanism 14 when the blades 300 and 301 are in their vertically separated position. On the assembly table or rear side of guillotine frame 304 an opposed pair of laterally spaced, parallel gibs 308 and 309 are affixed between which an upper blade holder 310 can reciprocate. A pair of switches 311 and 312 are mounted at the top of gibs 308 and 309, respectively. A trip block 313 is provided on holder 310 to trip the throw arm 314 of switch 311 when the holder 310 and upper blade 300 are in the raised position. Similarly, a trip block 315 is provided at the other side of the holder 310 to trip the throw arm 316 of the switch 312 when the holder 310 and blade 300 have reached the end of their cutting stroke. The purpose of switches 311 and 312 shall be explained hereinbelow.

One end of a connector arm 317 is secured to the holder 310, as by bolts 307, and the opposite end is threaded onto the end of a first piston rod 318 and secured thereto. The piston rod 318 is extended and retracted to lower and raise the blade holder 310 by virtue of the double-acting cylinder 302.

When the holder 310 is in its uppermost position, a locking mechanism 320 is employed to preclude inadvertent descent of the holder 310. Specifically, a bore 319 in the holder 310 receives a safety pin, or plunger, 321 which is reciprocated by a double-acting cylinder 322.

The cylinders 302 and 322 are both supported on an angle bracket 323 that is affixed to the overhead portion of the guillotine frame 304 by bolts (not shown). The plunger 321, which is also slidably received through the angle bracket 323 and guillotine frame 304, is threadably engaged with the piston rod 324, controlled by cylinder 322. A trip collar 325 (FIG. 12) is secured to the plunger 321 to trip the throw arm 326 of a switch 327 mounted on bracket 323. To provide clearance for the trip collar 325 and throw arm 326, the cylinder 322 is carried by a bracket 303 which is in turn affixed to the bracket 323.

With the plunger 321 received in the bore 319 of holder 310, as depicted in FIGS. 3, 9 and 10, the holder 310 is immobilized. However, when the safety pin 321 is retracted by cylinder 322 to disengage from the bore, the cylinder 302 may drive the holder 310 downwardly.

The upper blade 300 is mounted in a recess provided on holder 310 via bolts 328 passing through a blade support bar 329, the holder 310 and threadably received by the blade 300. The blade 300 is oriented to effect a shearing action against the lower blade 301 secured to the lower, or bed, portion of the guillotine frame 304 by bolts received by a lower blade support bar 330. The cutting edge 331 of the lower blade 301 may be tilted with respect to the cutting edge 332 of the upper blade 300 in order to obtain a progressive shearing action when the upper blade 300 is driven downwardly past the lower blade 301 — a highly desirable feature when the ribbon 18 being severed by the guillotine mechanism 15 is reinforced with wire.

A double-acting pneumatic cylinder 333 is mounted on a support member 334 extending from the end of the cantilevered beam 249 (FIG. 6). The piston rod 338 extending from cylinder 333 is connected to a yoke 339 which in turn is connected via pin 340 to a plate 341 extending downwardly from the angle bracket 323. Extension of the piston rod 338 causes the guillotine frame 304 to tilt toward the lead-in mechanism 12 from the vertical axis α to the tilted axis β as depicted in FIGS. 9 and 10. The axis α is coincident with an imaginary axis parallel to the plane of the guillotine frame 304 and perpendicular to the plane of the assembly table 376. As most clearly depicted in FIGS. 3 and 18, a spherical bearing 342 is carried by the support member 305. A bolt 343 passing through support 305 and bearing 342 is received in a threaded aperture 344 provided in guillotine frame 304. A clearance between the frame 304 and support 305 may be provided with a washer 345 and allows the frame 304 to rock or pivot about the bolt 343 in response to activation of cylinder 333. An identical arrangement is provided behind a second bolt (not shown) for additional support of the guillotine frame 304.

The lower blade 301 is removably carried between a stationary vacuum foot 346 (FIG. 19) and the guillotine frame 304 by a plurality of bolts (not shown). The foot 346 has a recess which forms a channel 348 with the blade 301. The channel 348 communicates with a passageway 347 which is in turn provided with a supply of subatmospheric air pressure, from a source not shown. The channel 348 is blocked laterally at both sides of the ribbon 18 and when the reduced air is applied, the air pressure above the ribbon holds the ribbon firmly down and in place in the area of the cut between the blades 300 and 301.

To further facilitate the firm and steady positioning of the ribbon 18 as it is cut, a movable spring foot 349 is provided. The foot 349 is connected to two shafts 350, one of which is clearly depicted in FIG. 19. The shaft 350 is in turn received in an aperture 351 carried in a bar 352 which is bolted to the blade holder 310. A compression spring 353 urges the foot 349 away from the bar 352 until such time as the blade holder 310 descends upon the ribbon 18. First to engage the ribbon on the cutting stroke, the foot flattens it against the lower blade 301 for an instant before and after the cut is made, then upon the ascension of the blade holder 310, the severed end of the ribbon upon the lead-in table 60, is held in position by the reduced air pressure within channel 348. Without the aid of the movable foot 349 and stationary foot 346, accurate metering of a subsequent length of ribbon by the shuttle head 100 onto the assembly mechanism 14 may be adversely affected.

As also depicted in FIG. 19 an angle bracket 354 extending from the lead-in or front side of the stationary foot 346, supports an extension 355 of the table 60 of lead-in mechanism 12. Small nut and bolt combinations 356 join the extension 355 to the bracket 354 in order for the table 60 to rock with the guillotine frame 304. The table extension 355 and bracket 354 are not rigidly affixed to obviate flexing of the table 60 when the guillotine frame 304 is tilted. Alternatively, a more elaborate, hinged bracket could be employed in lieu of bracket 354. Return of the frame 304 to a vertical or resting position (FIGS. 3 and 12) by the cylinder 333 is adjustably controlled via threaded rod 358 interposed between the support member 334 and plate 341.

The purpose for the rocking or tilting movement of the guillotine frame 304 and the lead-in table 60 is to eliminate the possible movement of a severed strip 19 of ribbon after its deposit onto the assembly mechanism 14 by the shuttle head 100. As was discussed hereinabove, such movement has been occasioned by engagement of severed strands of reinforcing wire which remain contiguous after the upper knife blade 300 has been raised and also by engagement of the severed end of a ribbon strip, reposed upon the assembly table, with the lower knife blade 301. Either occurrence is undesirable inasmuch as subsequent indexing or advancement of the assembly table 376, by an increment sufficient to allow deposition of a new length of ribbon, while the previously deposited severed strip is in engagement with the lower knife blade or contiguous ribbon, impedes advancement of the severed strip thereby causing a discontinuity between itself and previously deposited strips in addition to interfering with the subsequent length of ribbon transported by the shuttle head 100. As a result, operation must be interrupted to allow the malaligned strip to be removed or properly aligned.

With reference to FIG. 10, it is observed that when the guillotine frame 304 has been tilted the lower knife blade 301 and reinforcing filaments are withdrawn a minute, albeit sufficient, distance from the previously severed strip of ribbon to allow this strip to advance along the assembly mechanism 14, without interference. Subsequently, the guillotine frame 304 is drawn back to its vertical position (FIG. 3) prior to descent of the upper blade 300 to allow the next length of ribbon, properly deposited upon the assembly mechanism 14, to be cut to an exact length. Again, sequencing and the specific operation of the guillotine mechanism 15 has been set forth hereinbelow.

Assembly Mechanism

Figure 20:
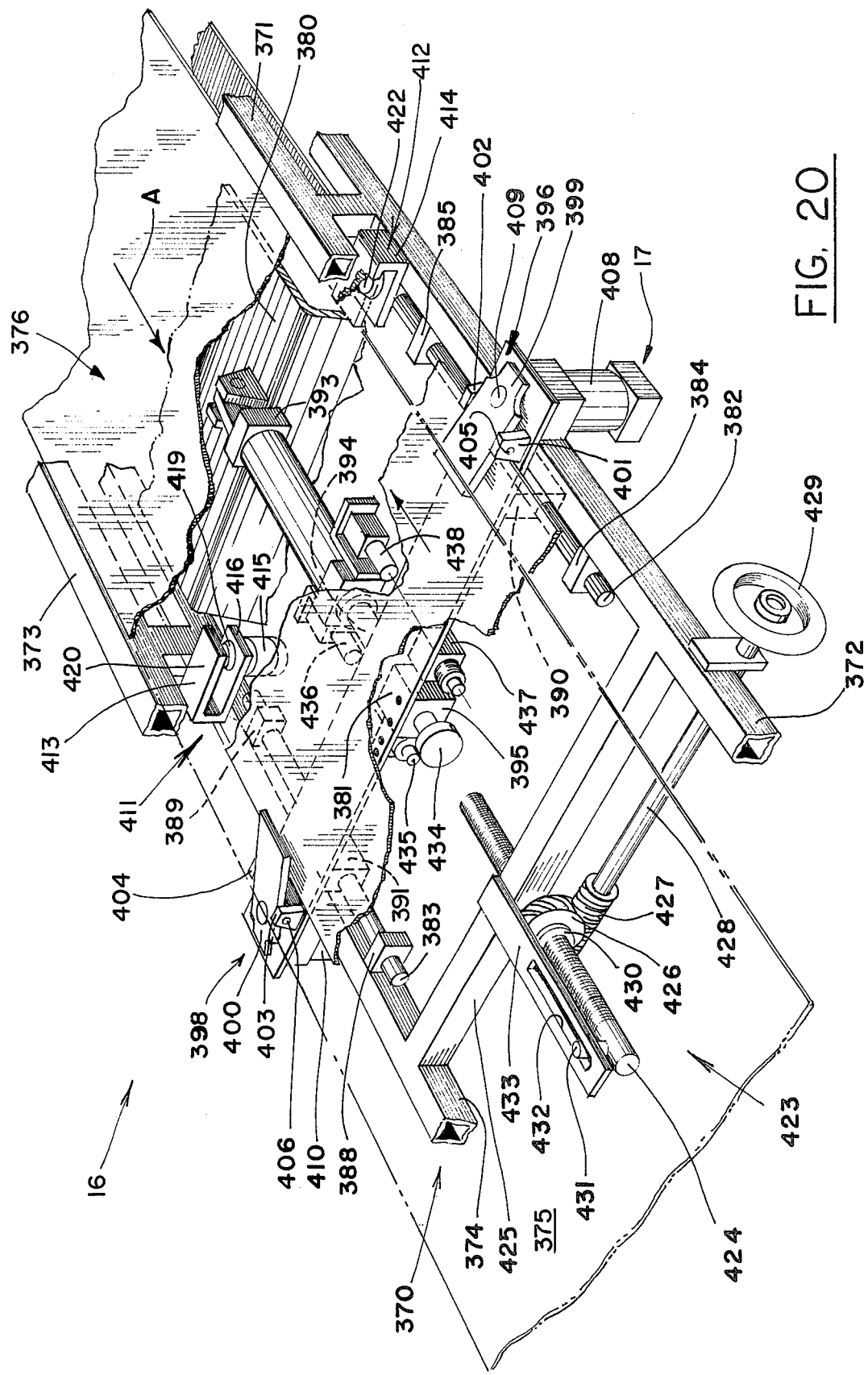
FIG. 20 is a perspective, partially broken away, depicting the structure of the assembly mechanism and particularly the means by which the belt forming the table portion of the assembly mechanism is progressively indexed; and, FIG. 21 is an exploded perspective which depicts the stitcher mechanism and the means by which it is pivotally mounted to the assembly mechanism.
Figure 21:
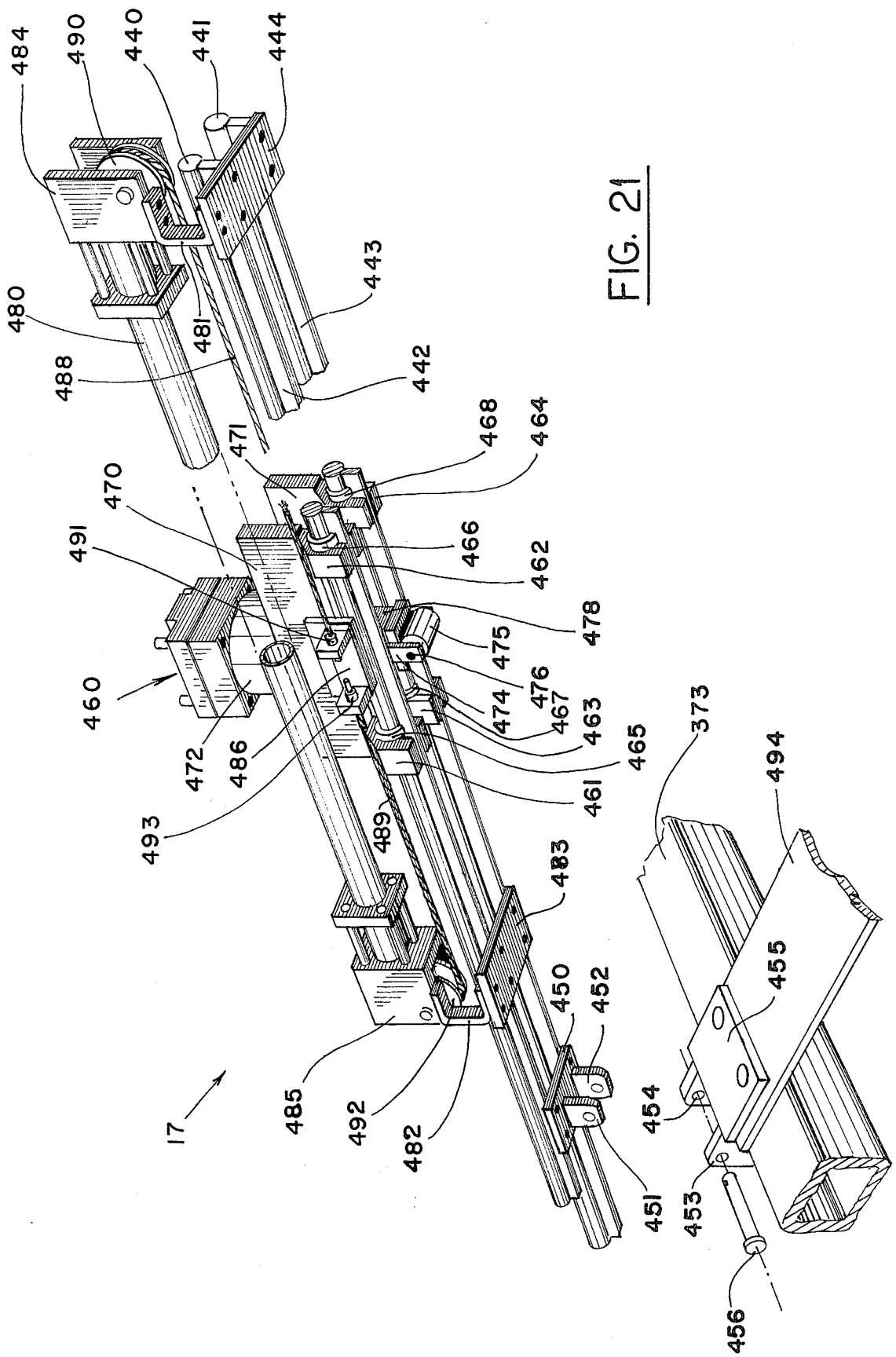

With reference now to FIG. 20 indexing of the assembly mechanism 14 shall be described. The assembly mechanism 14 includes a bed, generally 370 comprising horizontal conveyor frame members 371, 372, 373 and 374 cantilevered from the base frame 11; the continuous belt 375, the upper run of which passes over a plate (not shown), provided between frame members 371 and 373, to support the belt during descent of the shuttle head 100 thereon and deposition of the ribbon 18 to be severed, and is referred to herein as the assembly table 376; and, rolls 378 and 379 (FIG. 1) about which the belt is carried. Two smaller rollers carried between rollers 378 and 379 and not shown are positioned to guide the return of the belt 375 through the assembly mechanism. A large floor plate 380 may be affixed between frame members 372 and 374 to form the bottom of the assembly mechanism 14.

A movable cross plate 381 spans the width of the assembly mechanism passing between and extending beyond frame members 371-372 and 373-374. A pair of parallel rails 382 and 383 are mounted in support blocks 384-385 and 388-389, respectively, which extend from frame members 372 and 374, respectively. Slider blocks 390 and 391 are bolted to the underside of cross plate 381 and allow the plate to be driven along rails 382 and 383. To facilitate this movement a pneumatic cylinder 393 is mounted on floor plate 380 and the piston 394 thereof is connected to a block 395 bolted to the underside of cross plate 381. Thus, protraction of the piston 394 moves the cross plate 381 away from the transfer mechanism 13 and retraction thereof draws the cross plate 381 toward the mechanism 13.

A pair of index clamps, generally 396 and 398, are positioned at opposite ends of cross plate 381. The clamps 396 and 398 comprise clamp plates 399 and 400, respectively, pivotally mounted between support blocks 401-402 and 403-404 by pins 405 and 406, respectively. A pneumatic cylinder 408 affixed to the underside of cross plate 381 has a piston rod 409 extending through a bore in plate 381 and pivotally connected to clamp plate 399. Extension of piston 409 urges the opposite edge of clamp plate 399 to contact cross plate 381 while retraction thereof creates a clearance for the underside of belt 375 allowing movement of the cross plate 381 with respect thereto without disturbing the position of the belt 375. A similar cylinder 410 activates the index clamp 398 in the same manner as and simultaneously with the index clamp 396.

A pair of brake clamps, generally 411 and 412, are mounted on the assembly mechanism 14 upstream of the cross plate 381, i.e., closer to the transfer mechanism, and include U-shaped mounting brackets 413 and 414, respectively, which are affixed between frame members 373-374 and 371-372, respectively. A pneumatic cylinder 415 is attached in an inverted position to the lower flange 416 of bracket 413. A piston extends through an aperture in flange 416 and carries a brake pad 419 for increased contact area which, in response to activation of the cylinder, is urged against the upper flange 420 of bracket 413 and upon retraction allows passage of the belt 375. A similar cylinder (not shown) and brake pad 422 is provided with the other mounting bracket 414 and, generally, both brake clamps 411 and 412 are activated as a pair.

An adjustment mechanism for movement of the cross plate 381 is desirable to control and vary indexing of the assembly table 376. Such a mechanism, generally 423, includes a threaded stop rod 424, passing through and supported by a bar 425 affixed to frame members 372 and 374. A gear 426 is threadably carried by the rod 424 and meshes with a worm gear 427 connected to a shaft 428 extending under frame member 372 and provided with a handwheel 429 or other suitable device. The gear 426 is partially enclosed within a bracket (not shown) and thrust bearings 430 are provided to prohibit its movement upon stop rod 424. A vertically extending lug 431 is affixed near the end of stop rod 424 and is slidable within an elongate slot 432 provided in a guide bar 433 which may be carried by the bar 425 or other suitable structure. Thus, the stop rod 424 does not rotate with the gear 426, but rather moves in and out with respect to the support bar 425 in response to rotation of the handwheel. The end of stop rod 424 defines the extent to which the cross plate 381 may be extended by the cylinder 393. Return of the cross plate is determined by the total retraction of the piston 394 into cylinder 393. A stop 434 may be provided on block 395 beneath cross plate 381 to engage the stop rod 424.

A shock absorber 435 may be provided at one side of the block 395 to cushion the retraction of the cross plate 381 against a stop 436 which may be provided on cylinder 393. A switch 437 is provided at the other side of the block 395 and is activated by engagement with a stop 438, also provided on cylinder 393, upon retraction of the cross plate 381 for purposes set forth hereinbelow.

During operation, the underside of the belt 375 is fed between the cross plate 381 and clamp plates 399 and 400, and between index brake pads 419 and 422 and bracket flanges 413 and 414. When the brake clamps are released, the belt 375 may be passed freely therethrough as when the index clamps 396 and 398 have gripped the belt against the cross plate 381 and the cylinder 393 retracts the piston 394 until the shock absorber 435 engages stop 436 and switch 437 engages stop 438. Such movement advances the upper surface of the belt, assembly table 376, in the direction of the arrow A. The brake clamps 411 and 412 are activated by switch 437 to clamp and secure the belt in a fixed position for deposit of a length of reinforced ribbon 18 and the severing thereof. At this time, the index clamps 396 and 398 release and the cylinder 393 protracts the piston 394 and cross plate 381 until stop rod 424 is engaged. The distance or throw of piston rod 394 is determined by the width of the ribbon allowing some lesser distance when overlap of subsequent ribbon strips is to be effected. This cycle is thereafter repeated to allow precise indexing of the assembly table 376 for each subsequent deposit of reinforced ribbon 18. By holding the 375 belt alternatively between the index clamps 396 and 398 and the brake clamps 411 and 412, precise positioning is facilitated. The exact sequence of the indexing steps has been set forth hereinbelow in conjunction with the description of the preferred operation of the apparatus 10.

Stitcher Mechanism

With reference now to FIG. 21 the stitcher mechanism 17 shall be described. The mechanism includes a pair of parallel rails 440 and 441 which rest on rail supports 442 and 443, respectively, and which span the width of the assembly table 376 extending slightly beyond the frame members 371 and 373. An end plate 444 is bolted to the underside of supports 442 and 443 to maintain the rails 440 and 441 in spaced, parallel relation. The end plate 444 is received on a spacer plate (not shown), affixed to the frame member 371, which elevates the mechanism 17 over the assembly table 376. A spring-biased arm (not shown) is provided on frame member 371 to hold the end plate 444 and, in turn, the mechanism 17 down during stitching operations.

An end plate 450 is provided at the opposite end of rails 440 and 441 and is also bolted to supports 442 and 443. The plate preferably carries ears 451 and 452 which mate with ears 453 and 454 extending from a spacer plate 455 which is affixed to frame member 373. A hinge pin 456 passes through bores in the ears 451–454 which permits the entire mechanism 17 to be pivotally swung onto and off of the assembly table 376 by release of the spring arm which catches end plate 444. Alternatively, the end plates 444 and 450 could be bolted to the frame, although it is preferable to have the mechanism 17 readily disengageable with the assembly table 376. It is preferable that either the spacer plates or the end plates be provided with slots through which the connecting bolts may pass into frame members 371 and 373 in order to facilitate adjustment of the stitcher mechanism 17 for alignment with the seams of contiguous strips 19 of ribbon deposited upon the assembly table 376.

Movable over the rails 440 and 441 is a trolley, generally 460, which includes slider blocks 461 and 462 on rail 440 and slider blocks 463 and 464 on rail 441. The blocks 461–464 are each provided with C-shaped bearings, 465–468, respectively, which encircle the rails 440 and 441 above supports 442 and 443. A side plate 470 is bolted to the upper surfaces of blocks 461 and 462 and a similar side plate 471 is bolted to blocks 463 and 464. Centered between side plates 470 and 471 and carried thereby is a double-acting pneumatic cylinder 472. The piston from cylinder 472 carries a clevis 474 to which a stitcher wheel 475 is rotatably mounted via pin 476. A flat plate 478 is preferably bolted to the cylinder 472, extending downwardly between side plates 470 and 471. The plate 478 provides support for the clevis 474 when it is down and stitching over the assembly table 376 as will be described hereinbelow.

In order for the trolley 460 to traverse the width of the assembly table 376 a double-acting cable cylinder 480 is provided and is supported over the table 376 by a pair of C-shaped brackets 481 and 482. Bracket 481 is fastened directly to end plate 444 while bracket 482 is affixed to a support plate 483 which is bolted to the underside of rail supports 442 and 443 as are the end plates 444 and 450. A pair of pulley blocks 484 and 485 are bolted to brackets 481 and 482, respectively, between which is connected the cylinder 480 which operates a double-acting piston (not shown) that is connected to a bracket 486 provided on trolley 460 by cables 488 and 489. Cable 488 is reeved about the pulley 490 in block 484 and is connected to the bracket 486 at 491 and cable 489 is reeved about the pulley 492 in block 485 and is connected to the bracket 486 at 493.

During operation of the apparatus 10, pressure is applied to one end of cylinder 480 to return the trolley 460 to the far or hinged side of the stitcher mechanism 17. At this time the stitcher wheel 475 is retracted by the cylinder 472. When the assembly table 376 is at rest, a condition described hereinbelow, the cylinder 472 is activated, extending the stitcher wheel 475 down to engage the seam of two contiguous strips 19 of reinforced ribbon. Of course, before the fabric formed on the assembly table 376 reaches the stitcher mechanism 17, as is the condition in FIG. 1, the stitcher wheel 475 passes immediately above the surface of the table 376. As soon as the stitcher wheel 475 is down, pressure applied to the opposite end of cylinder 480 protracts the trolley 460 to the opposite side of the mechanism 17, i.e., toward end plate 444. In order to provide the necessary support for the stitching operation, not inherently presented by the conveyor belt 375, a stitcher plate 494 is provided beneath the assembly table 376, bolted between frame member 371 and end plate 444 at one end and frame member 373 and end plate 450 at the far end.

The stitcher mechanism 17 is suitably positioned over the assembly table 376 at a location which is an incremental multiple of the width of ribbon from which the continuous fabric is being constructed. Thus, once the fabric reaches the stitcher each subsequent indexing operation should present a lapped seam of two contiguous severed strips of ribbon. With the stitcher wheel 475 down, movement of the trolley 460 over the rails 440 and 441 combines the edges, substantially eliminating any extra thickness of the rubber at the seam and effectively joining the edges to produce a fabric, which for all practical manufacturing purposes, is as strong as if continuously calendered. In fact, in random tensile tests of the fabric, subjecting it to stresses sufficient to stretch the rubber and increase the relative distances between reinforcement filaments to a degree greater than would actually occur during tire construction operations, no tearing or separation at the seams has been observed.

Operation

The operation of the improved apparatus 10 begins with a ribbon 18 of reinforced elastomeric material positioned on the receiving surface 68 of the table 60 presented from lead-in mechanism 12. The operator actuates the reset button 500 on the control head 501 which assures that the shuttle head 100 of the transfer mechanism 13 is fully retracted to its position over the assembly mechanism 14 and is in its raised, or unclamped, position (FIG. 3). As such, the trolley 165 has tripped switch 181 (FIGS. 6, 7 and 8), which signals that the shuttle head has retracted, and the collar 246 on the bell crank connecting link 213 over the lead-in mechanism 12 has tripped switch 242 (FIG. 3) to signal that the shuttle head 100 is in its fully raised, or unclamped, position.

Two other conditions must also be met before the operation begins — i.e., the trip lug 313 on the guillotine blade holder 310 must have tripped switch 311 (FIG. 17) to signal that the upper blade 300 of the guillotine mechanism 15 is in its fully raised position, and the trip collar 325 on the safety pin 321 must not have tripped switch 327 to signal that the safety pin is in its extended position, thereby locking the movable blade of the guillotine in its fully raised position.

With these conditions met actuation of the start button 502 on the control head 501 will permit the apparatus 10 to commence operation at the beginning of its operating cycle. Operation begins by admission of fluid pressure to that side of the double-acting cylinder 160 (FIG. 6) which translates the trolley 165 away from switch 181 to effect translatory extension of the shuttle head 100 from its position over the assembly mechanism 14 toward its position over the receiving surface 68 of the lead-in mechanism 12. The same fluid pressure which extends the shuttle head also communicates with one side of the pancake cylinder 274 to extend the throw arm 270 of flipper switch 269 (FIG. 16) into the path of the head portion 123 on the bell crank link 121 associated with the primary shuttle carrier 118 located above the assembly mechanism 14.

When the shuttle head 100 is protracted to the predetermined extent required, the trolley 165 trips switch 179. This signals the fact that the shuttle head is extended to the degree desired and initiates the occurrence of the following simultaneous events. A subatmospheric pressure is established in the plenum 142 comprising the chamber within the shuttle head 100, and fluid pressure is admitted to cylinder 333 causing the guillotine frame 304 to pivot from axis α to axis β thereby moving the fixed, lower blade 301 away from the assembly mechanism 14 and translating the table 60 of the lead-in mechanism 12 incrementally therewith. At the same time fluid pressure is admitted to cylinder 124 of the first actuating means 101 which moves the shuttle head 100 downwardly to its clamped position (FIG. 9). In moving the shuttle head to its clamped position the head portion 123 on bell crank link 121 trips the throw arm 270 on flipper switch 269 (FIG. 16).

The tripping of switch 269 is quite important. It not only triggers a time delay sequence, the first stage of which retains the shuttle head in its downward, clamped position for a time interval sufficient to allow the plenum 142 therein to be sufficiently evacuated that the pressure differential between the plenum and atmosphere firmly engages the ribbon 18 against the undersurface 144 of the shuttle head 100 but also negates the effect of the signal created as the collar 245 on bell crank link 213 trips switch 241 (FIG. 9). As will hereinafter become more apparent, the tripping of switch 241 is instrumental in actuating the cutting of the ribbon by guillotine mechanism 15, and this step must, of course, be negated when the shuttle head is in its protracted position beneath the movable guillotine blade 300.

Upon expiration of the first stage in the time-delay sequence, fluid pressure is admitted to double-acting cylinder 124 (FIG. 4) so as to raise the shuttle head 100 to its unclamped position (FIG. 10), now with the ribbon 18 secured therebeneath. The second stage of the time delay assures that the shuttle head is in its fully raised, or unclamped position, before pressure is admitted to double-acting cylinder 160 to effect retractive reciprocation of the shuttle head to its position above the assembly mechanism 14 (FIG. 11). The fluid pressure which retracts the shuttle head also actuates the pancake cylinder 274 to retract the throw arm 270 of flipper switch 269 out of the path of the head portion 123 on the bell crank link 121 (FIG. 14).

As soon as the trolley 165 disengages from switch 179 fluid pressure is admitted to double-acting cylinder 333 to swing the guillotine frame 304 back to its vertical, cutting position. The table 60 of the lead-in mechanism 12, which is tied to the guillotine frame, incrementally reciprocates in conformity with the swinging movement of the guillotine frame 304.

The fully retracted position of shuttle head 100 is signaled when the trolley 165 trips switch 181. This signal again actuates cylinder 124 to drive the shuttle head downwardly to its clamped position (FIG. 12), but this time the flipper plate 261 has been retracted and the head portion 123 on the bell crank link 121 does not trip switch 269 (FIG. 15) as the shuttle head is moved to its clamped position. As such, the signal induced as the collar 245 on bell crank link 213 trips switch 241 is not negated by the signal from switch 269 and the cutting cycle is commenced.

The initial step in the cutting cycle is the withdrawal of the safety pin 321 which causes collar 325 to trip switch 327. This is occasioned by fluid pressure to cylinder 322 during clamping action but only if switches 179 and 269 have not been tripped.

The second step in the cutting cycle commences only if switches 181, 241 and 327 have been tripped. These switches signal, respectively, that the shuttle head is fully retracted, that the shuttle head is clamped and that the safety pin is withdrawn. With those conditions satisfied cylinder 302 drives the upper guillotine blade 300 downwardly past the cutting edge of the fixed blade 301 to sever an incremental strip 19 from the ribbon 18.

As the second step in the cutting cycle is being carried out, the indexing clamps 396 and 398 are actuated to grasp the lower run of the belt 375 forming the table portion 376 of the assembly mechanism 14.

When the upper blade 300 of the guillotine mechanism 15 reaches the end of its cutting stroke a trip block 315 on the holder 310 trips switch 312. This signals: the release of the brake clamps 411 and 412 on belt 375; the introduction of a superatmospheric pressure to the plenum 142 within shuttle head 100; and, the pressurization of cylinder 302 to raise the upper guillotine blade 300. The introduction of the superatmospheric pressure into plenum 142 assures that the incremental strip 19 does not adhere to the shuttle head 100 as it is unclamped. Switch 311 is tripped as the upper guillotine blade 300 reaches its uppermost position. This signals the introduction of fluid pressure to that side of cylinder 124 which unclamps the shuttle head 100. This same fluid pressure also acts on cylinder 322 to drive the safety pin 321 into its locked position.

The tripping of switch 312 further signals the introduction of fluid pressure into cylinder 333 to tilt the guillotine frame 304 about its axis.

As the shuttle head 100 reaches its unclamped position, switch 242 signals the actuation of cylinder 393 to translate the cross plate 381 with indexing clamps 396 and 398, thereby accurately positioning the precisely deposited incremental strip 19 preparatory to receipt of the next strip on the assembly table presented by the upper run of the belt 375. Tripping of switch 242 also signals the actuation of cylinder 160 to effect translatory extension of the shuttle head 100 over the lead-in mechanism 12 in the amount desired.

The indexing of the belt 375 trips switch 437. When both switches, 179 (indicating full extension of the shuttle head 100) and 437, are tripped: the brake clamps 411 and 412 clamp the belt 375; subatmospheric pressure is applied to plenum 142; and, the shuttle head 100 is moved to the clamping position (which trips switch 241, the effect of which is bypassed by tripping of switch 269, as previously described). Following the first stage of the time-delay sequence initiated by tripping switch 269 the shuttle head 100 unclamps and trips switch 242 which signals the release of index clamps 396 and 398 and actuation of cylinder 393 to move the index clamps into position for its successive engagement with the lower run of belt 375. The apparatus 10 continues its cyclic operation with the retraction of the shuttle head following the second stage of the time delay.

It should be appreciated that in the foregoing explanation of the operation, the indexing mechanism did not come into operation until after the first elemental strip had been deposited onto the assembly table 376 and severed from the ribbon. It is for that reason that the foregoing explanation picks up the recycle of the time-delay stage rather than at the very beginning of the operational explanation. It is to be understood that in the foregoing explanation of the operation, the particular timing of the stitcher mechanism has not been included inasmuch as the activation thereof may be initiated whenever the assembly table is at rest, i.e., not being indexed for deposit of an elemental strip of ribbon 18.

Thus, it should be apparent from the foregoing description of the preferred embodiment that the present invention herein described accomplishes the objects of the invention.

We claim:

1. Apparatus for making reinforced fabric from a ribbon of uncured elastomeric material in which a reinforcement has been encapsulated comprising: a frame; a lead-in mechanism from which the ribbon is withdrawn; an assembly mechanism supported by said frame and upon which adjacent strips of ribbon are joined to form the fabric; a guillotine mechanism mounted on said frame between said lead-in and assembly mechanisms, operable to sever measured lengths of the reinforced elastomeric ribbon deposited on said assembly mechanism; means for tilting said guillotine mechanism; a primary shuttle carrier located above said assembly mechanism; a stabilizing shuttle carrier located above said lead-in mechanism; a shuttle head mounted on said primary carrier for movement with and with respect thereto; first actuating means to move said primary shuttle carrier and said shuttle head in a generally vertical direction; yoke means interconnecting said primary and stabilizing shuttle carriers to effect vertical movement of said stabilizing shuttle carrier concurrently with said primary shuttle carrier for movement of said shuttle head onto and away from said lead-in mechanism and said assembly mechanism; second actuating means selectively to protract and retract said shuttle head horizontally with respect to said primary carrier whereby a length of ribbon is withdrawn from a position over said lead-in mechanism to a position over said assembly mechanism; means on said stabilizing shuttle carrier slidably to engage said shuttle head when protracted and thereby stabilize said shuttle head; an assembly table carried by said assembly mechanism, upon which a plurality of strips of the ribbon are joined to make the fabric; and, a movable stitcher mechanism cycled to follow the abutting edges of contiguous strips of the ribbon in order to stitch them together.

2. Apparatus, as set forth in claim 1, further comprising: means for mounting said guillotine mechanism to tilt with respect to an axis extending perpendicularly from said assembly.

3. Apparatus for making reinforced fabric from a ribbon of uncured elastomeric material in which a reinforcement has been encapsulated comprising: a frame; a lead-in mechansim from which the ribbon is withdrawn; an assembly mechanism supported by said frame and upon which adjacent strips of ribbon are joined to form the fabric; a guillotine mechanism mounted on said frame between said lead-in and assembly mechanisms, operable to sever measured lengths of the reinforced elastomeric ribbon deposited on said assembly mechanism and including a guillotine frame; a stationary blade carried by said guillotine frame; a blade holder reciprocably carried by said guillotine frame; a movable blade carried by said blade holder; means for moving said blade holder and movable blade toward said stationary blade to effect a shearing action thereagainst; a primary shuttle carrier located above said assembly mechanism; a stabilizing shuttle carrier located above said lead-in mechanism; a shuttle head mounted on said primary carrier for movement with and with respect thereto; first actuating means to move said primary shuttle carrier and said shuttle head in a generally vertical direction; yoke means interconnecting said primary and stabilizing shuttle carriers to effect vertical movement of said stabilizing shuttle carrier concurrently with said primary shuttle carrier for movement of said shuttle head onto and away from said lead-in mechanism and said assembly mechanism; second actuating means selectively to protract and retract said shuttle head horizontally with respect to said primary carrier whereby a length of ribbon is withdrawn from a position over said lead-in mechanism to a position over said assembly mechanism; means on said stabilizing shuttle carrier slidably to engage said shuttle head with protracted and thereby stabilize said shuttle head; an assembly table carried by said assembly mechanism, upon which a plurality of strips of the ribbon are joined to make the fabric; a movable stitcher mechanism cycled to follow the abutting edges of contiguous strips of the ribbon in order to stitch them together; means for mounting said guillotine mechanism to tilt with respect to an axis extending perpendicularly from said assembly mechanism; and, means for tilting said guillotine mechanism; wherein said lead-in mechanism includes a movable table for support of the reinforced elastomeric ribbon, said table being affixed to said guillotine mechanism and tiltable therewith.

4. Apparatus, as set forth in claim 3, wherein said apparatus further comprises: a stationary foot mounted adjacent said stationary blade and forming an elongate channel therewith; means provided in said stationary foot for supplying a source of subatmospheric pressure to said channel whereby the reinforced elastomeric ribbon is held on said stationary foot over said channel by normal atmospheric pressure; and, means for attaching said movable table to said stationary foot.

5. Apparatus, as set forth in claim 4, wherein said apparatus further comprises: a movable foot supported by said blade holder and engageable with said stationary blade to hold the reinforced elastomeric ribbon therebetween when said movable blade is driven against said stationary blade to sever a length of the ribbon.

6. Apparatus, as set forth in claim 1, wherein said assembly mechanism comprises: a movable endless belt forming an assembly table; clamp means for moving said assembly table and engageable with a portion thereof; actuating means for reciprocably moving said clamp means and said assembly table with respect to said frame; and, brake means for prohibiting movement of said assembly table in one direction while said actuating means acts to move said clamp means.

7. Apparatus, as set forth in claim 6, wherein said clamp means comprise: a cross plate carried beneath said assembly table; means for slidably mounting said plate to said frame; at least one clamp plate pivotally mounted on said cross plate and above said assembly table; means for urging said clamp plate against said assembly table and cross plate; and, wherein said actuating means comprises a double-acting pneumatic cylinder mounted between said frame and said cross plate.

8. Apparatus, as set forth in claim 6, wherein said brake means comprise: at least one bracket affixed to said frame and having two flanges between which said assembly table may pass; a brake pad movable against a first of said flanges whereupon passage of said assembly table is prohibited; and, means carried by the second of said flanges for reciprocating said brake pad against and away from said first flange.

9. Apparatus, as set forth in claim 6, wherein said apparatus further comprises: adjustable stop means engageable with said clamp means for controlling the length of travel thereof in response to activation of said actuating means.

10. Apparatus, as set forth in claim 1, wherein said stitcher mechanism comprises: a track carried above said assembly table by said frame; a trolley movable along said track; a first actuating means for moving said trolley; a stitcher wheel engageable with the abutting edge of contiguous strips of the reinforced ribbon; and, second actuating means carried by said trolley for applying said stitcher wheel to the reinforced ribbon.

11. Apparatus, as set forth in claim 1, further comprising: a guillotine mechanism mounted on said frame between said lead-in and assembly mechanisms, operable to sever measured lengths of the reinforced elastomeric ribbon; means for mounting said guillotine mechanism to tilt with respect to an axis extending perpendicularly from said assembly mechanism; means for tilting said guillotine mechanism; and, wherein said assembly mechanism comprises: a movable endless belt forming an assembly table; clamp means for moving said assembly table and engageable with a portion thereof; actuating means for reciprocably moving said clamp means and said assembly table with respect to said frame; and, brake means for prohibiting movement of said assembly table in one direction while said actuating means acts to move said clamp means.

12. Apparatus, for making reinforced fabric from a ribbon of uncured elastomeric material in which a reinforcement has been encapsulated comprising: a frame; a lead-in mechanism from which the ribbon is withdrawn; an assembly mechanism supported by said frame and upon which adjacent strips of ribbon are joined to form the fabric; a guillotine mechanism mounted on said frame between said lead-in and assembly mechanisms, operable to sever measured lengths of the reinforced elastomeric ribbon deposited on said assembly mechanism; means for mounting said guillotine mechanism to tilt with respect to an axis extending perpendicularly from said assembly mechanism; means for tilting said guillotine mechanism; a primary shuttle carrier located above said assembly mechanism; a stabilizing shuttle carrier located above said lead-in mechanism; a shuttle head mounted on said primary carrier for movement with and with respect thereto; first actuating means to move said primary shuttle carrier and said shuttle head in a generally vertical direction; yoke means interconnecting said primary and stabilizing shuttle carriers to effect vertical movement of said stabilizing shuttle carrier concurrently with said primary shuttle carrier for movement of said shuttle head onto and away from said lead-in mechanism and said assembly mechanism; second actuating means selectively to protract and retract said shuttle head horizontally with respect to said primary carrier whereby a length of ribbon is withdrawn from a position over said lead-in mechanism to a position over said assembly mechanism; means on said stabilizing shuttle carrier slidably to engage said shuttle head when protracted and thereby stabilize said shuttle head; an assembly table carried by said assembly mechanism, upon which a plurality of strips of the ribbon are joined to make the fabric; and, a movable stitcher mechanism cycled to follow the abutting edges of contiguous strips of the ribbon in order to stitch them together wherein said assembly mechanism comprises: a movable endless belt forming an assembly table; clamp means for moving said assembly table and engageable with a portion thereof; actuating means for reciprocably moving said clamp means and said assembly table with respect to said frame; and, brake means for prohibiting movement of said assembly table in one direction while said actuating means acts to move said clamp means; and, wherein said lead-in mechanism comprises: a movable table for support of the reinforced elastomeric ribbon, said table being affixed to said guillotine mechanism and tiltable therewith, and wherein said clamp means comprise: a cross plate carried beneath said assembly table; means for slidably mounting said plate to said frame; at least one clamp plate pivotally mounted on said cross plate and above said assembly table; and means for urging said clamp plate against said assembly table and cross plate; and, wherein said actuating means comprises a double-acting pneumatic cylinder mounted between said frame and said cross plate.

13. Apparatus, as set forth in claim 1, further comprising: a guillotine mechanism mounted on said frame between said lead-in and assembly mechanisms, operable to sever measured lengths of the reinforced elastomeric ribbon; means for mounting said guillotine mechanism to tilt with respect to an axis extending perpendicularly from said assembly mechanism; means for tilting said guillotine mechanism; and, a movable stitcher mechanism cycled to follow the abutting edges of contiguous strips of the ribbon in order to stitch them together.

14. Apparatus, for making reinforced fabric from a ribbon of uncured elastomeric material in which a reinforcement has been encapsulated comprising: a frame; a lead-in mechanism from which the ribbon is withdrawn; an assembly mechanism supported by said frame and upon which adjacent strips of ribbon are joined to form the fabric; a guillotine mechanism mounted on said frame between said lead-in and assembly mechanisms, operable to sever measured lengths of the reinforced elastomeric ribbon deposited on said assembly mechanism; means for mounting said guillotine mechanism to tilt with respect to an axis extending perpendicularly from said assembly mechanism; means for tilting said guillotine mechanism; a primary shuttle carrier located above said assembly mechanism; a stabilizing shuttle carrier located above said lead-in mechanism; a shuttle head mounted on said primary carrier for movement with and with respect thereto; first actuating means to move said primary shuttle carrier and said shuttle head in a generally vertical direction; yoke means interconnecting said primary and stabilizing shuttle carriers to effect vertical movement of said stabilizing shuttle carrier concurrently with said primary shuttle carrier for movement of said shuttle head onto and away from said lead-in mechanism and said assembly mechanism; second actuating means selectively to protract and retract said shuttle head horizontally with respect to said primary carrier whereby a length of ribbon is withdrawn from a position over said lead-in mechanism to a position over said assembly mechanism; means on said stabilizing shuttle carrier slidably to engage said shuttle head 30. Apparatus, as set forth in claim 26, wherein said stitcher mechanism comprises: a track carried above said assembly table by said frame; a trolley movable along said track; a first actuating means for moving said trolley; a stitcher wheel engageable with the abutting edge of contiguous strips of the reinforced ribbon; and, second actuating means carried by said trolley for applying said stitcher wheel to the reinforced ribbon.

31. Apparatus for making reinforced fabric from a ribbon of uncured elastomeric material in which a reinforcement has been encapsulated comprising: a lead-in mechanism from which the ribbon is withdrawn and an assembly mechanism upon which adjacent strips of ribbon are joined to form the fabric; guide means carried by said lead-in mechanism preliminarily to orient the ribbon received thereon; a primary shuttle carrier located above said assembly mechanism; a stabilizing shuttle carrier located above said lead-in mechanism; a shuttle head mounted on said primary carrier for movement with and with respect thereto; first actuating means to move said primary shuttle carrier in a generally vertical direction; yoke means interconnecting said primary and stabilizing shuttle carriers to effect vertical movement of said stabilizing shuttle carrier concurrently with said primary shuttle carrier for movement of said shuttle head onto and away from said lead-in mechanism and said assembly mechanism; rail means presented from said shuttle head; means on said primary shuttle carrier slidably to engage said rail means and thereby support said shuttle head; second actuating means selectively to protract and retract said shuttle head horizontally with respect to said primary carrier; and, means on said stabilizing shuttle carrier slidably to engage said rail means when said shuttle head is protracted and thereby stabilize said shuttle head.

32. Apparatus, as set forth in claim 31, in which signal means are provided to distinguish between the operation of said first actuating means to move said shuttle carrier downwardly when the shuttle head is protracted as compared to when said shuttle head is retracted.

33. Apparatus, as set forth in claim 31, in which a primary stringer is supported above said assembly mechanism, a plurality of bell cranks pivotally mounted on said stringer, said primary shuttle carrier pivotally connected to the bell cranks carried on said primary stringer and link means interconnecting said first actuating means to said bell cranks.

34. Apparatus, as set forth in claim 33, in which a signal means is carried on a flipper plate, said second actuating means operative to reciprocate said flipper plate in coordination with the protraction and retraction of said shuttle head, said flipper plate translated to permit actuation of the signal means by said link means when said shuttle head is protracted, and said flipper plate being translated to preclude actuation of the signal means by said link means when said shuttle head is retracted.

35. Apparatus, as set forth in claim 33, in which a secondary stringer is supported above said lead-in mechanism, a plurality of bell cranks pivotally mounted on said secondary stringer, said stabilizing shuttle carrier pivotally connected to the bell cranks carried on said secondary stringer and link means interconnecting said bell cranks carried on said secondary stringer.

36. Apparatus, as set forth in claim 35, in which at least one bell crank carried on said primary stringer is provided with a motion-imparting throw arm, at least one bell crank carried on said secondary stringer provided with a motion-receiving throw arm, and said yoke means being operatively connected between said motion-imparting and motion-receiving throw arms.

37. Apparatus, as set forth in claim 36, in which said yoke means has first and second, opposed ends, a pivotal connection being effected between the first end of said yoke means and at least one of said throw arms, a gimbal being pivotally secured to the other said throw arm, means to secure said gimbal to the second end of said yoke means, and means adjustably to position the second end of said yoke means along said gimbal whereby to effect vertical alignment of said stabilizing shuttle carrier with respect to said primary shuttle carrier.

38. Apparatus, as set forth in claim 31, in which rail means are presented from said shuttle head, a plurality of bearings supported in said primary shuttle carrier slidingly to support said rail means.

39. Apparatus, as set forth in claim 38, in which a plurality of bushings are supported in said stabilizing shuttle carrier, said bushings adapted releasably to engage said rail means and thereby slidably support the same.

40. Apparatus, as set forth in claim 39, in which said rail means comprise at least one bulbous head portion presented upwardly of said shuttle head and extending horizontally therealong, each bearing and each bushing having a C-shaped cross section slidably to engage said bulbous head portion.

41. Apparatus for making reinforced fabric from a ribbon of uncured elastomeric material in which a reinforcement has been encapsulated comprising: a frame; a lead-in mechanism from which the ribbon is withdrawn; an assembly mechanism upon which strips of ribbon are joined to form the fabric; a transfer mechanism for the movement of the reinforced elastomeric ribbon from said lead-in mechanism to said assembly mechanism; a guillotine mechanism mounted on said frame between said lead-in and assembly mechanisms, operable to sever measured lengths of the reinforced elastomeric ribbon; means for mounting said guillotine mechanism to tilt with respect to an axis extending perpendicularly from said assembly mechanism; and, means for tilting said guillotine mechanism; wherein said lead-in mechanism comprises: a movable table for support of the reinforced elastomeric ribbon, said table being affixed to said guillotine mechanism and tiltable therewith.

42. Apparatus, as set forth in claim 41, wherein said guillotine mechanism comprises: a guillotine frame; a stationary blade carried by said guillotine frame; a blade holder reciprocably carried by said guillotine frame; a movable blade carried by said blade holder; means for moving said blade holder and movable blade toward said stationary blade to effect a shearing action thereagainst;

43. Apparatus, as set forth in claim 42, wherein said apparatus further comprises: a stationary foot mounted adjacent said stationary blade and forming an elongate channel therewith; means provided in said stationary foot for supplying a source of subatmospheric pressure to said channel whereby the reinforced elastomeric ribbon is held on said stationary foot over said channel by normal atmospheric pressure; and, means for attaching said movable table to said stationary foot.

44. Apparatus, as set forth in claim 43, wherein said apparatus further comprises: a movable foot supported by said blade holder and engageable with said stationary blade to hold the reinforced elastomeric ribbon therebetween when said movable blade is driven against said stationary blade to sever a length of the ribbon.

* * * * *

30. Apparatus, as set forth in claim 26, wherein said stitcher mechanism comprises: a track carried above said assembly table by said frame; a trolley movable along said track; a first actuating means for moving said trolley; a stitcher wheel engageable with the abutting edge of contiguous strips of the reinforced ribbon; and, second actuating means carried by said trolley for applying said stitcher wheel to the reinforced ribbon.

31. Apparatus for making reinforced fabric from a ribbon of uncured elastomeric material in which a reinforcement has been encapsulated comprising: a lead-in mechanism from which the ribbon is withdrawn and an assembly mechanism upon which adjacent strips of ribbon are joined to form the fabric; guide means carried by said lead-in mechanism preliminarily to orient the ribbon received thereon; a primary shuttle carrier located above said assembly mechanism; a stabilizing shuttle carrier located above said lead-in mechanism; a shuttle head mounted on said primary carrier for movement with and with respect thereto; first actuating means to move said primary shuttle carrier in a generally vertical direction; yoke means interconnecting said primary and stabilizing shuttle carriers to effect vertical movement of said stabilizing shuttle carrier concurrently with said primary shuttle carrier for movement of said shuttle head onto and away from said lead-in mechanism and said assembly mechanism; rail means presented from said shuttle head; means on said primary shuttle carrier slidably to engage said rail means and thereby support said shuttle head; second actuating means selectively to protract and retract said shuttle head horizontally with respect to said primary carrier; and, means on said stabilizing shuttle carrier slidably to engage said rail means when said shuttle head is protracted and thereby stabilize said shuttle head.

32. Apparatus, as set forth in claim 31, in which signal means are provided to distinguish between the operation of said first actuating means to move said shuttle carrier downwardly when the shuttle head is protracted as compared to when said shuttle head is retracted.

33. Apparatus, as set forth in claim 31, in which a primary stringer is supported above said assembly mechanism, a plurality of bell cranks pivotally mounted on said stringer, said primary shuttle carrier pivotally connected to the bell cranks carried on said primary stringer and link means interconnecting said first actuating means to said bell cranks.

34. Apparatus, as set forth in claim 33, in which a signal means is carried on a flipper plate, said second actuating means operative to reciprocate said flipper plate in coordination with the protraction and retraction of said shuttle head, said flipper plate translated to permit actuation of the signal means by said link means when said shuttle head is protracted, and said flipper plate being translated to preclude actuation of the signal means by said link means when said shuttle head is retracted.

35. Apparatus, as set forth in claim 33, in which a secondary stringer is supported above said lead-in mechanism, a plurality of bell cranks pivotally mounted on said secondary stringer, said stabilizing shuttle carrier pivotally connected to the bell cranks carried on said secondary stringer and link means interconnecting said bell cranks carried on said secondary stringer.

36. Apparatus, as set forth in claim 35, in which at least one bell crank carried on said primary stringer is provided with a motion-imparting throw arm, at least one bell crank carried on said secondary stringer provided with a motion-receiving throw arm, and said yoke means being operatively connected between said motion-imparting and motion-receiving throw arms.

37. Apparatus, as set forth in claim 36, in which said yoke means has first and second, opposed ends, a pivotal connection being effected between the first end of said yoke means and at least one of said throw arms, a gimbal being pivotally secured to the other said throw arm, means to secure said gimbal to the second end of said yoke means, and means adjustably to position the second end of said yoke means along said gimbal whereby to effect vertical alignment of said stabilizing shuttle carrier with respect to said primary shuttle carrier.

38. Apparatus, as set forth in claim 31, in which rail means are presented from said shuttle head, a plurality of bearings supported in said primary shuttle carrier slidingly to support said rail means.

39. Apparatus, as set forth in claim 38, in which a plurality of bushings are supported in said stabilizing shuttle carrier, said bushings adapted releasably to engage said rail means and thereby slidably support the same.

40. Apparatus, as set forth in claim 39, in which said rail means comprise at least one bulbous head portion presented upwardly of said shuttle head and extending horizontally therealong, each bearing and each bushing having a C-shaped cross section slidably to engage said bulbous head portion.

41. Apparatus for making reinforced fabric from a ribbon of uncured elastomeric material in which a reinforcement has been encapsulated comprising: a frame; a lead-in mechanism from which the ribbon is withdrawn; an assembly mechanism upon which strips of ribbon are joined to form the fabric; a transfer mechanism for the movement of the reinforced elastomeric ribbon from said lead-in mechanism to said assembly mechanism; a guillotine mechanism mounted on said frame between said lead-in and assembly mechanisms, operable to sever measured lengths of the reinforced elastomeric ribbon; means for mounting said guillotine mechanism to tilt with respect to an axis extending perpendicularly from said assembly mechanism; and, means for tilting said guillotine mechanism; wherein said lead-in mechanism comprises: a movable table for support of the reinforced elastomeric ribbon, said table being affixed to said guillotine mechanism and tiltable therewith.

42. Apparatus, as set forth in claim 41, wherein said guillotine mechanism comprises: a guillotine frame; a stationary blade carried by said guillotine frame; a blade holder reciprocably carried by said guillotine frame; a movable blade carried by said blade holder; means for moving said blade holder and movable blade toward said stationary blade to effect a shearing action thereagainst;

43. Apparatus, as set forth in claim 42, wherein said apparatus further comprises: a stationary foot mounted adjacent said stationary blade and forming an elongate channel therewith; means provided in said stationary foot for supplying a source of subatmospheric pressure to said channel whereby the reinforced elastomeric ribbon is held on said stationary foot over said channel by normal atmospheric pressure; and, means for attaching said movable table to said stationary foot.

44. Apparatus, as set forth in claim 43, wherein said apparatus further comprises: a movable foot supported by said blade holder and engageable with said stationary blade to hold the reinforced elastomeric ribbon therebetween when said movable blade is driven against said stationary blade to sever a length of the ribbon.

* * * * *

UNITED STATES PATENT OFFICE
CERTIFICATE OF CORRECTION

PATENT NO. : 4,087,308
DATED : May 2, 1978
INVENTOR(S) : Robert Charles Baugher, Robert Henry Bond,
Walter William Immel, Sr., Ralph Frederick Kiemer It is certified that error appears in the above-identified patent and that said Letters Patent are hereby corrected as shown below:

Abstract - 5th line from bottom "continguous" should be --contiguous--

Column 1, line 20, "tibers" should read --fibers--

Column 12, line 1, --263-- should be inserted between words "ways" and "in"

Column 21, line 56, after "assembly" insert --mechanism--

Column 22, line 22, "with" should read --when--

Column 25, line 2, "carrier" should read --carried--

Column 30, line 53, after the word "against" delete the --;-- and substitute a "."

Signed and Sealed this

Thirty-first Day of October 1978

[SEAL]

Attest:

RUTH C. MASON
Attesting Officer

DONALD W. BANNER
Commissioner of Patents and Trademarks